United States Patent [19]
Apps

[11] Patent Number: 5,184,748
[45] Date of Patent: Feb. 9, 1993

[54] LOW-DEPTH NESTABLE TRAY FOR FLUID CONTAINERS

[75] Inventor: William P. Apps, Anaheim, Calif.

[73] Assignee: Rehrig Pacific Company, Inc., Los Angeles, Calif.

[21] Appl. No.: 888,479

[22] Filed: May 22, 1992

Related U.S. Application Data

[63] Continuation of Ser. No. 739,721, Jul. 30, 1991, abandoned, which is a continuation of Ser. No. 369,598, Jun. 21, 1989, abandoned.

[51] Int. Cl.⁵ .............................................. B65D 21/00
[52] U.S. Cl. .................................... 220/519; 220/509; 220/516; 206/201; 206/503; 206/518; 206/821
[58] Field of Search ............... 206/201, 427, 499, 503, 206/505, 506, 507, 515, 518, 519, 520, 821; 220/509, 510, 516, 517, 519, 552

[56] References Cited

U.S. PATENT DOCUMENTS

| | | |
|---|---|---|
| D. 98,200 | 1/1936 | Worthington ..................... 220/516 |
| D. 150,031 | 9/1946 | Richards . |
| D. 202,826 | 11/1965 | Weiss . |
| D. 208,111 | 7/1967 | Vidal . |
| D. 274,110 | 6/1984 | Vigue . |
| D. 275,142 | 8/1984 | Torokvei . |
| D. 284,841 | 7/1986 | Rowland et al. . |
| D. 290,580 | 6/1987 | Vigue . |
| D. 322,917 | 1/1992 | Morris et al. . |
| 820,445 | 5/1906 | Speer . |
| 1,817,805 | 8/1931 | Davenport ......................... 220/509 |
| 2,181,150 | 1/1936 | Pittenger . |
| 2,535,493 | 12/1950 | Gerber . |
| 2,743,030 | 4/1956 | Read, Jr. . |
| 2,758,742 | 8/1956 | Farrell . |
| 2,777,597 | 1/1957 | Ruff .................................... 220/97 |
| 2,918,379 | 8/1958 | Lurie . |
| 2,970,715 | 2/1961 | Kappel et al. . |
| 3,009,579 | 11/1961 | Ettlinger, Jr. ..................... 220/21 |
| 3,055,542 | 9/1962 | Russo ................................ 220/104 |
| 3,055,543 | 9/1962 | Russo ................................ 206/515 |
| 3,104,044 | 9/1963 | Reifers .............................. 229/2.5 |
| 3,130,860 | 5/1961 | Oberkircher . |
| 3,203,583 | 8/1965 | Amberg et al. .................... 220/102 |
| 3,219,233 | 11/1965 | Whiteford .......................... 220/102 |
| 3,245,573 | 4/1966 | Bakos ................................ 220/516 |
| 3,297,190 | 5/1967 | Cloyd . |
| 3,332,574 | 7/1967 | Earp .................................. 206/519 |
| 3,344,530 | 8/1967 | de Larosiere ..................... 206/203 |
| 3,349,943 | 10/1967 | Bo .................................... 205/507 |
| 3,363,802 | 1/1968 | Cornelius . |
| 3,420,402 | 1/1969 | Frater et al. ....................... 220/97 |
| 3,643,812 | 2/1972 | Mander et al. . |
| 3,756,429 | 9/1973 | Fleischer et al. . |

(List continued on next page.)

FOREIGN PATENT DOCUMENTS

| | | |
|---|---|---|
| 0062958 | 4/1982 | European Pat. Off. . |
| 2801077 | 7/1978 | Fed. Rep. of Germany . |
| 1224622 | 6/1960 | France . |
| 1306810 | 12/1962 | France . |
| 1351218 | 6/1964 | France . |

(List continued on next page.)

Primary Examiner—David T. Fidei
Attorney, Agent, or Firm—Banner, Birch, McKie & Beckett

[57] ABSTRACT

Reusable plastic trays for storing and transporting beverage containers, such as twelve-ounce metal cans and two-liter PET bottles. The tray floor has thereon an array of support areas for the containers. The tray rail thereof is spaced high enough above the floor and in a "low-depth" design to prevent the containers on the support areas from tipping during transport. A generally rectangular band having upright inside and outside faces and an outward lip on top of the band form the rail. Columns between adjacent support areas interconnect the rail and the floor and angle downwardly and inwardly therebetween. The columns open outwardly and thereby define vertical slots into which the columns of a similar tray can be slidingly received. The trays when empty can thereby be stacked in a deeply nesting position whereby each additional tray adds generally only the height of its narrow rail to the height of the nested trays.

59 Claims, 22 Drawing Sheets

U.S PATENT DOCUMENTS

| | | | |
|---|---|---|---|
| 3,759,416 | 9/1973 | Constantine | 206/505 |
| 3,791,549 | 2/1974 | Delbrouck et al. | 206/203 |
| 3,794,208 | 2/1974 | Roush et al. | 206/507 |
| 3,812,996 | 5/1974 | Bunnell . | |
| 3,891,084 | 6/1975 | Elizondo-Garcia . | |
| 3,905,510 | 9/1975 | Johnson . | |
| 4,011,948 | 3/1977 | Rehrig et al. | 206/515 |
| 4,095,720 | 6/1978 | Delbrouck et al. | 220/21 |
| 4,098,403 | 7/1978 | Davis | 206/519 |
| 4,195,746 | 4/1980 | Cottrell | 220/4 |
| 4,197,958 | 4/1980 | Zeni et al. | 206/503 |
| 4,205,749 | 6/1980 | Carroll et al. | 206/507 |
| 4,242,834 | 1/1981 | Olsen | 47/73 |
| 4,256,224 | 3/1981 | Hirota | 206/203 |
| 4,304,334 | 12/1981 | Hirota | 206/507 |
| 4,316,540 | 2/1982 | Lapham | 206/507 |
| 4,319,685 | 3/1982 | David | 206/508 |
| 4,326,629 | 4/1982 | Tate . | |
| 4,349,109 | 9/1982 | Scordato et al. | 206/562 |
| 4,373,627 | 2/1983 | Wood | 206/201 |
| 4,410,099 | 10/1983 | de Larosiere | 220/21 |
| 4,416,374 | 11/1983 | Smith et al. | 206/507 |
| 4,423,813 | 1/1984 | Kreeger et al. | 206/507 |
| 4,538,742 | 9/1985 | Prodel | 220/21 |
| 4,567,981 | 2/1986 | Headon | 206/821 |
| 4,593,816 | 6/1986 | Langenbeck . | |
| 4,615,444 | 10/1986 | de Larosiere | 206/427 |
| 4,655,360 | 4/1987 | Juhanson | 220/519 |
| 4,718,555 | 1/1988 | Amberg . | |
| 4,770,554 | 9/1988 | Warwick | 220/516 |
| 4,823,955 | 4/1989 | Apps | 206/506 |
| 4,834,243 | 5/1989 | Langenbeck | 206/557 |
| 4,838,419 | 6/1989 | Weits et al. | 206/507 |
| 4,872,560 | 10/1989 | Langenbeck | 206/557 |
| 4,884,712 | 12/1989 | Schoeller et al. . | |
| 4,899,874 | 2/1990 | Apps et al. | 220/102 |
| 4,928,841 | 5/1990 | Arthurs . | |
| 4,932,532 | 6/1990 | Apps et al. | 220/519 |
| 4,944,400 | 7/1990 | Van Onstein . | |
| 5,009,053 | 4/1991 | Langenbeck et al. . | |
| 5,031,761 | 7/1991 | de Larosiere . | |
| 5,031,774 | 7/1991 | Morris et al. . | |
| 5,060,819 | 10/1991 | Apps . | |

FOREIGN PATENT DOCUMENTS

| | | | |
|---|---|---|---|
| 1400377 | 4/1965 | France . | |
| 1423963 | 12/1966 | France . | |
| 1474782 | 3/1967 | France . | |
| 2345353 | 10/1977 | France | 206/507 |
| WO82/01536 | 5/1982 | PCT Int'l Appl. . | |
| WO90/05679 | 5/1990 | PCT Int'l Appl. . | |
| WO91/17097 | 11/1991 | PCT Int'l Appl. . | |
| 568191 | 10/1975 | Switzerland . | |
| 573850 | 3/1976 | Switzerland | 220/516 |
| 1330778 | 9/1973 | United Kingdom . | |
| 2135278A | 8/1984 | United Kingdom . | |
| 2032886A | 5/1990 | United Kingdom . | |

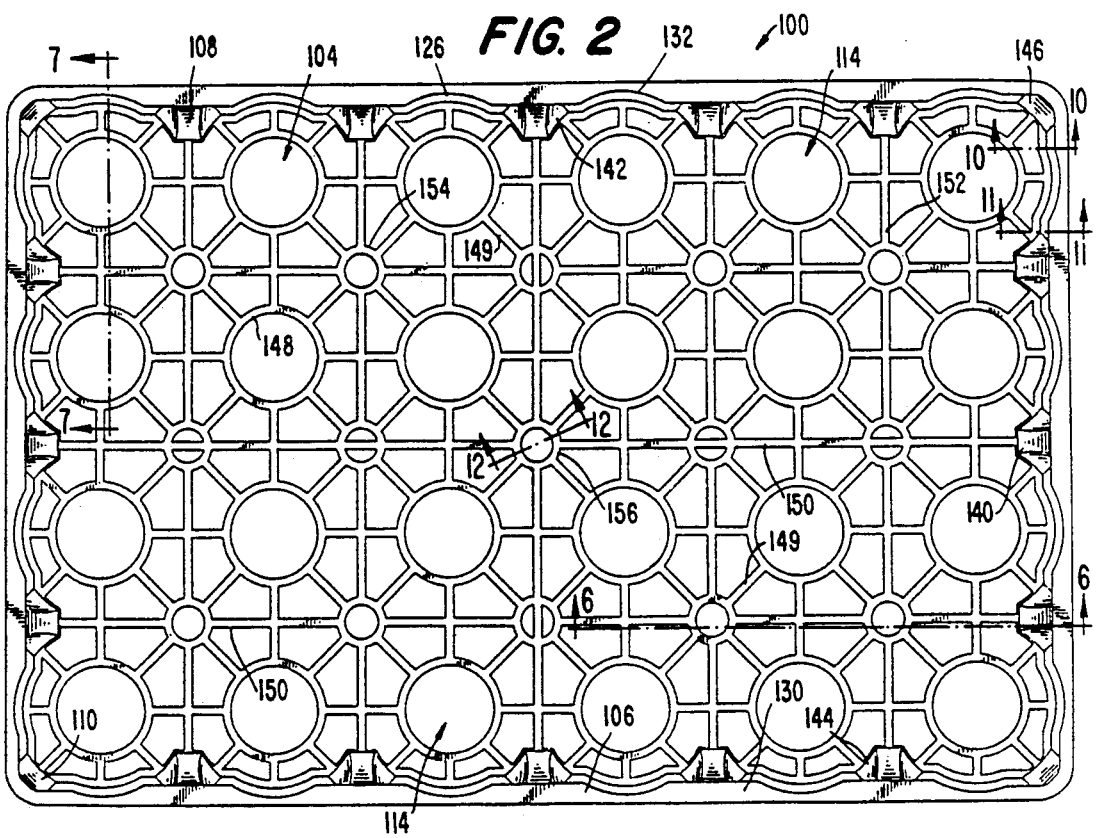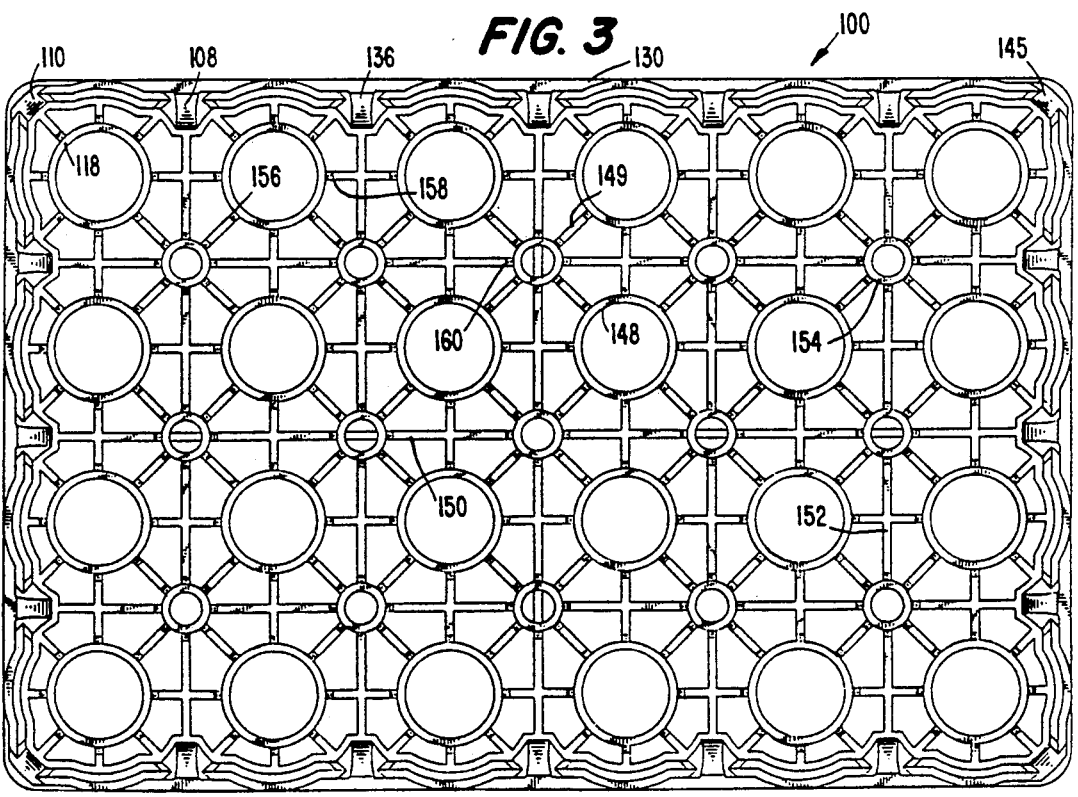

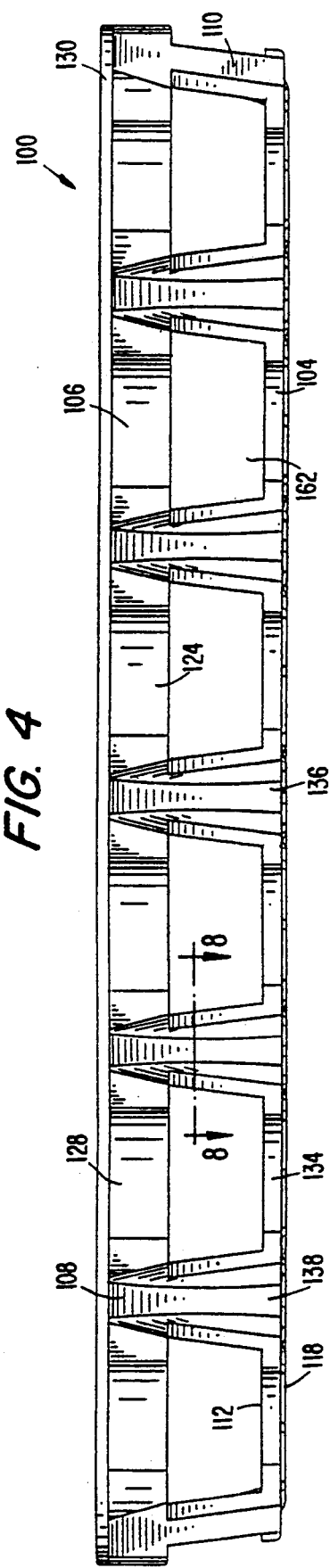
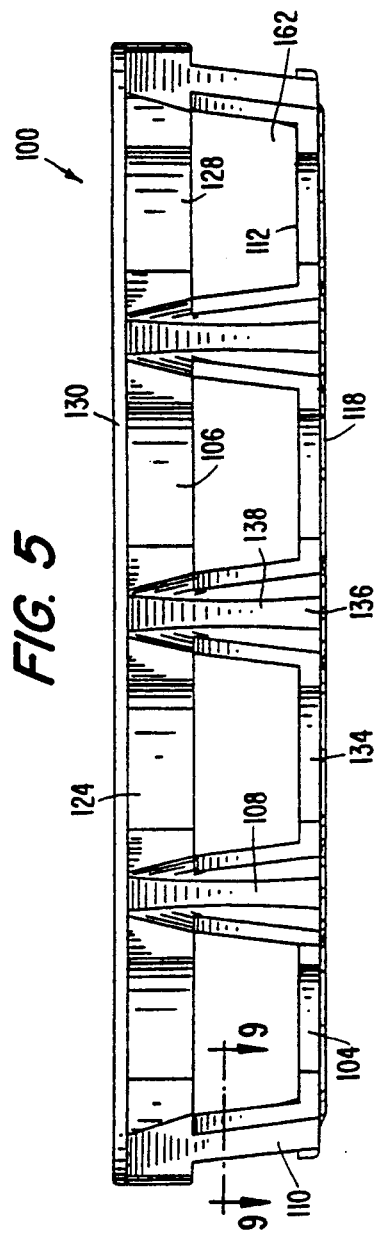

LOW-DEPTH NESTABLE TRAY FOR FLUID CONTAINERS

This is a continuation of Ser. No. 07/739,721 filed Jul. 30, 1991, now abandoned, which is a continuation of Ser. No. 07/369,598 filed Jan. 21, 1989 also now abandoned.

BACKGROUND OF THE INVENTION

The present invention relates to low depth, nestable trays for transporting and storing beverage containers, such as twelve-ounce aluminum cans and two-liter plastic bottles.

Cans for soft drinks, beer and other beverages are often stored and transported during the distribution stages thereof in short-walled cardboard trays or boxes. These cardboard trays are generally not rugged enough for reuse and therefore must be discarded by the retailer at his expense. They are flimsy and can collapse when wet. They also are unattractive and do not permit the full display, merchandising and advertising of the cans held therein. Thus, there has been a need for a returnable and reusable tray for storing and transporting cans and the like. This tray should be light weight, easy to manipulate and carry, and economically constructed. An example of a relatively recent, returnable and reusable tray particularly adapted for handling twenty-four twelve ounce, pull-top aluminum cans is that disclosed in copending application Ser. No. 07/272,039, now U.S. Pat. No. 4,932,532, of the present assignee. The entire contents of that application are hereby incorporated by reference.

When empty the reusable plastic trays of the '039 application are nestable one within the other so as to occupy less storage space and to be more easily handled. The trays are nestable only to a small extent, perhaps one-quarter of their total height. In other words, each additional tray adds about three-quarters of the total tray height to the stack of empty trays. A large amount of storage space is thus needed for the empty trays, and the stack of trays can be rather tall and cumbersome to handle. The sides of that tray are solid around their perimeter, and thus the lower portions of the cans or other containers held therein, especially when the loaded trays are stacked, are not exposed. This prevents the containers therein from being readily seen to both determine how full the trays are and also the container brand from its label.

Resuable plastic cases have also been developed for transporting and storing bottles such as two-liter beverage bottles. An example of a recent plastic, nesting and stacking storage container is that of U.S. Pat. No. 4,823,955 of the present assignee. These cases often have a height which is greater than the height of the bottles contained therein such that when stacked the cases do not rest on top of the bottles in the lower case. Rather, the sides of the cases bear the loads of the upper cases and their contents. These cases are expensive to manufacture, to ship and to store empty as they are relative large and occupy a great deal of space. Since they totally surround their bottles, they prevent them from being fully displayed.

Plastic low depth cases have thus been developed wherein the side walls are lower than the height of the stored bottles. The bottles contained in a lower case thereby support the weight of the other cases stacked on top of them. Today's plastic, polyethylene terephthalate (PET), bottles have become particularly popular because of their transparency, light weight and low cost. Even though they are flexible, their walls are strong in tension and thus can safely contain the pressure of carbonated beverages. Their flexible walls can bear surprisingly high compressive loads as well, provided that these loads are axially applied. Thus, it is important that the bottles do not tip in their cases or trays, as the loads thereon when stacked would then not be along the longitudinal axes of the bottles, and the loaded bottles can be caused to buckle. This is particularly true for the larger capacity PET bottles, such as the two-liter bottles widely used for soft drinks. Thus, some of the prior art cases require additional structure therein to hold the bottles stable. Others have handles which must be removed in order to stack the empty cases, which is an inconvenient and time consuming step. Some of these low depth cases also have higher walls which reduce their display capabilities.

One design of the stackable low depth cases particular suitable for the two-liter PET bottles is the "Castle Crate" design of the present assignee, such as is disclosed in copending application Ser. No. 07/186,140, whose entire contents are hereby incorporated by reference. For this genre of cases a plurality of columns project upwardly from the bottom case portion and together with the side walls help define a plurality of bottle retaining pockets. This case with its internal columns when empty resembles a medievel castle. These columns are hollow to permit empty crates to stack top to bottom. These low profile crates also have spaced side columns to provide added strength and yet still expose the containers therein. This design though requires a certain registration of the empty crates for nesting purposes making the procedure a slight bit more cumbersome and time consuming than desirable.

Beverages in the twelve or sixteen ounce sizes are often sold loose or individually, that is, not in an attached six-pack arrangement, especially in convenience stores. To remove the bottles or cans from their six-pack (secondary) packaging, whether a shrink wrap, a cardboard enveloping carton, or a interconnected plastic ring arrangement, is a labor intensive procedure.

Some of the known trays do not continually hold their beverage containers in a spaced relation so that the containers rub against one another or before crate structure while in transport. This action can rub off the container labels or scratch the containers, and is a particular problem for metal soft drink and beer cans.

SUMMARY OF THE INVENTION

Accordingly, it is a principal object of the present invention to provide an improved nestable, low depth tray for storing and transporting containers such as beverage cans and bottles.

It is a further object of the present invention to provide an improved low depth, nestable container tray design which occupies less space both when in a loaded stacked relation and when in an empty nested relation.

It is a still further object of the present invention to provide an improved low depth, nestable tray design which has an open side configuration thereby allowing the containers loaded therein to be readily and more fully seen, counted and identified.

Another object of the present invention is to provide an improved low depth, nestable tray design which can be readily stacked in a deeply nested relation when empty without requiring any extra manipulation of one tray relative to another.

A further object of the present invention is to provide an improved low depth, nestable tray which can hold loose cans therein in a compact array while preventing them from rubbing against one another during transport.

A still further object of the present invention is to provide a plastic low depth, nestable tray which is light weight, economical to manufacture, and attractive.

Another object of the present invention is to provide an improved reusable tray which can transport and store loose containers as well as those connected and held securely in six-pack arrangements.

Directed to achieving these objects, a novel low depth, nestable tray for beverage containers is herein provided. This tray is formed by integrally molding from plastic three basic components, namely, a floor, an upper rail and a plurality of generally conical columns. The floor has on its top surface a plurality of fluid container support areas, each for supporting thereon a separate fluid container. The bottom floor surface in turn has a number of receiving areas for receiving thereon the tops of similar fluid containers in a layer in a similar tray beneath the floor. The rail is formed by an upright band having vertical inner and outer surfaces and a lip at the top thereof projecting outwardly a slight distance. The rail is positioned generally parallel to and above the floor so as to be below the tops of the fluid containers when resting on the floor but high enough relative to them to prevent them from tipping. The columns extend between, interconnect and merge with the floor and the rail. They are spaced around the outside of the floor and between adjacent support areas. Each of them has a generally truncated conical shape and defines a longitudinal slot disposed outwardly relative to the floor and extending generally from the bottom of the floor up to the lip. The slots taper upwardly, are inclined inwardly towards the floor, and are configured to slidingly receive therein the inner surfaces of similar columns in a similar tray such that the floor fits within the open rail when the trays are in an empty nested relation. The areas between the adjacent columns and between the rail and floor and along both sides and ends are open providing a light weight design which allows more complete visualization of the containers held in the tray. The floor preferably has an open grid-work design which not only is attractive but also requires less plastic material and therefore is lighter and cheaper than a more solid floor design. Stability corner posts extending downwardly and inwardly from the rail to the floor corner support areas can also be provided.

Other objects and advantages of the present invention will become more apparent to those persons having ordinary skill in the art to which the present invention pertains from the following description taken in conjunction with the accompanying drawings.

BRIEF DESCRIPTION OF THE DRAWINGS

FIG. 2 is a top plan view of the first tray.
FIG. 3 is a bottom plan view of the first tray.
FIG. 4 is a side elevational view of the first tray.
FIG. 5 is an end elevational view of the first tray.

DETAILED DESCRIPTION OF THE PREFERRED EMBODIMENTS OF THE INVENTION

Figure 1:
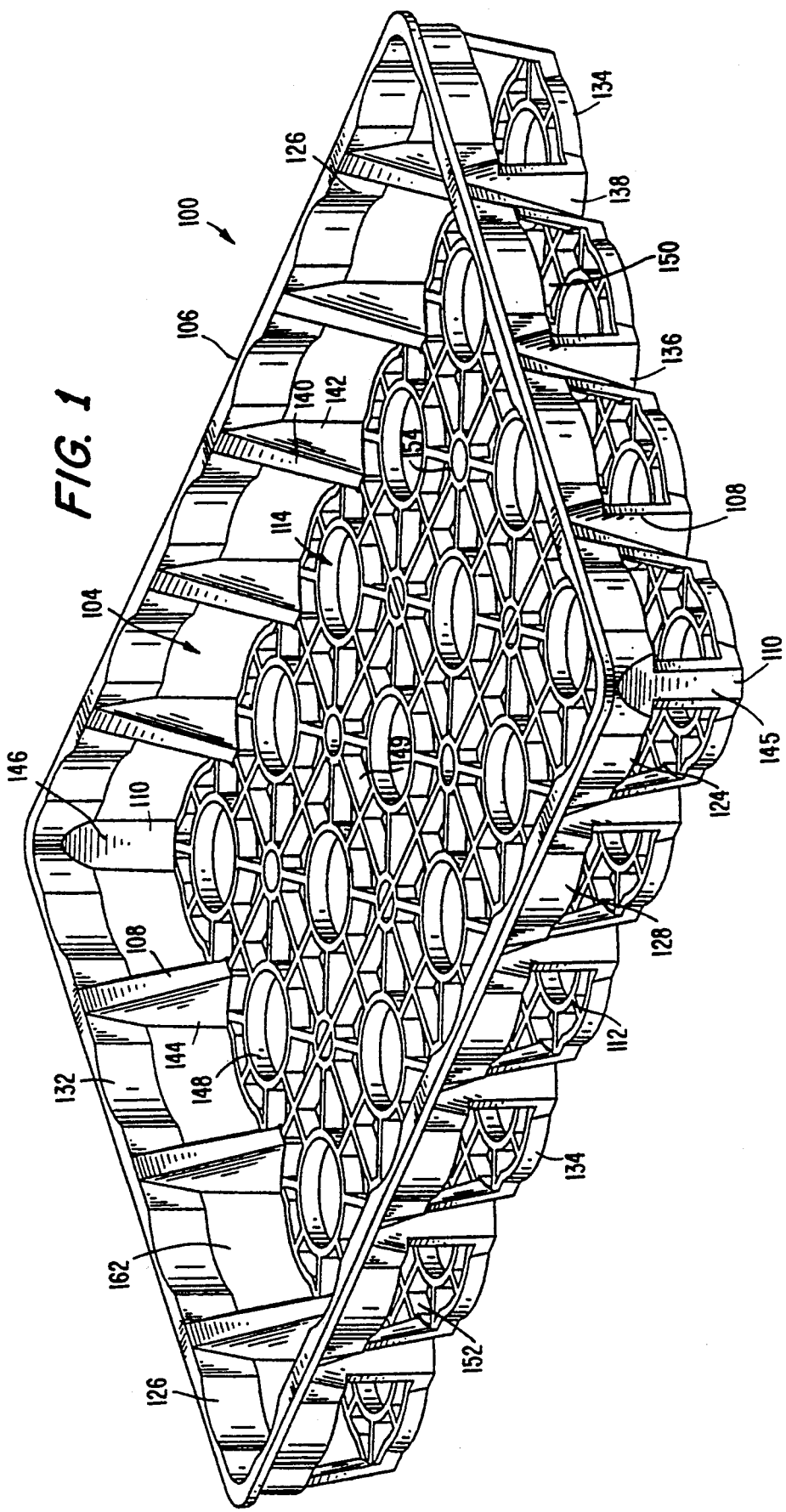
FIG. 1 is a top perspective view of a first tray of the present invention.
Figure 6:
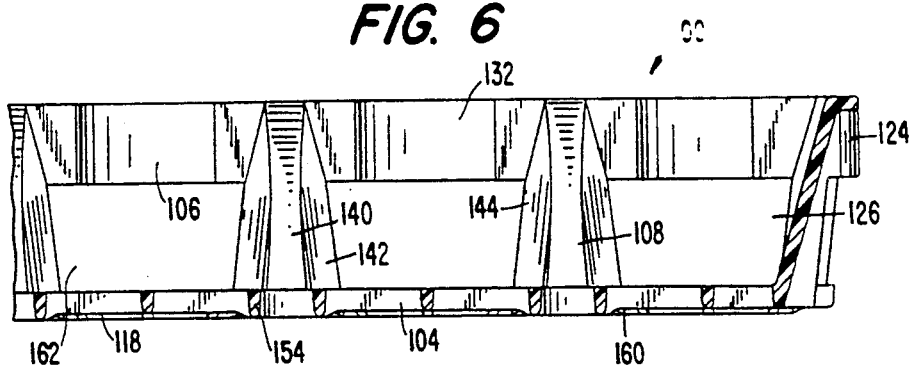
FIG. 6 is a cross-sectional view taken along line 6—6 of FIG. 2.

A number of variations of the present invention are possible, and some of them are illustrated in the drawings. This invention as will be explained can be adapted to hold generally any type of (fluid) container and is especially adaptable for twelve-once metal cans and two-liter PET bottles. It can hold the containers (cans) in six packs or individually.

A first preferred tray embodiment of the present invention is shown in FIGS. 1-14 generally at 100. Tray 100 is especially adapted for holding twelve-once metal cans, such as are typically used for soft drinks and beer and shown for example in FIG. 14 at 102. Tray 100 will be described in greater detail than the other trays, and the description thereof for corresponding parts can be referred to for the other later-described tray embodiments.

Tray 100 is integrally molded from a plastic, such as polyethelene, and comprises four basic components, namely, a floor 104, a rectangular rail 106 spaced above and generally parallel to the floor, a plurality of columns 108 extending between and interconnecting the floor 104 and the rail 106, and support posts 110 at each of the four corners of the tray 100 interconnecting the rail 106 and the floor 104 and providing additional corner support for the tray 100. These corner support posts 110 are, however, not required for this invention as will be apparent from some of the other embodiments described later herein.

Figure 14:
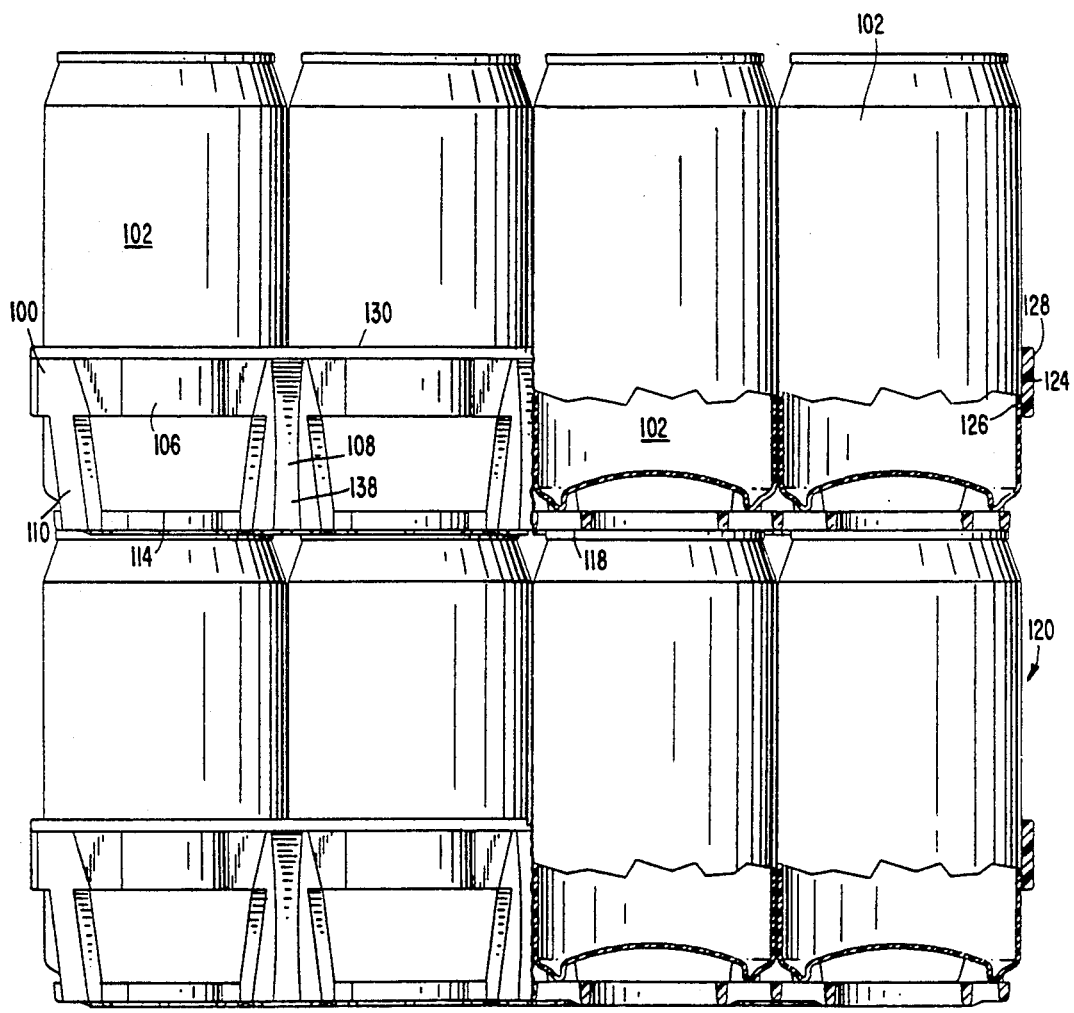
FIG. 14 is an end elevational view, with portions thereof broken away, of the first tray in a loaded and stacked position.

The floor 104 has an upper surface 112 defining a plurality (twenty-four) of fluid container support areas 114 for supporting thereon the fluid containers 102. Each support area 114 is generally 2.650 inch square. The floor bottom surface 116 has a plurality of receiving areas 118 for receiving thereon the tops of similar fluid containers in a layer in a similar tray directly beneath the floor, as depicted in FIG. 14 generally at 120 by a similar (identical) loaded tray. It is also within the scope of this invention to provide a plurality of beveled redoubt members positioned and spaced on and extending down from the floor bottom surface 116, such as are described in the previously-mentioned '039 application. These beveled redoubt members provide a sliding surface so that tray 100 when loaded can be easily slid along the lips of the can tops of a similar loaded tray 120 therebeneath without having to be lifted off therefrom thereby making it easier to handle the loaded and stacked trays.

The rail 106 is positioned by the columns 108 above the floor 104 a sufficient height to prevent the containers 102 held on the floor from tipping when the tray 100 is being transported. It is low enough, however, in a "low depth" configuration so that the tops of the containers 102 on the floor 104 extend above it, and the containers themselves then directly support the weight of loaded trays thereabove, as can be understood from FIG. 14. Unlike the earlier-mentioned "Castle Crate" design, there is no need for any additional structure extending up from the rail 106 or from the central portion of the floor 104. The rail 106 in turn comprises a band 124 having vertical inner and outer walls 126, 128 and a flange or lip 130 at the top thereof extending out a slight distance therefrom. The end corners of the band 124 and lip 130 are smoothly rounded. The vertical orientations of the inner and outer walls 126, 128 are shown in cross section in FIGS. 7, 10, 11, and 14. Since the outer wall 128 does not angle or flare, the overall dimensions of the tray 100 are kept to a minimum— about the same as that of a corrugated case. The tray 100 has a total height of 2.000 inches, a width (as viewed in FIG. 2) of 10.750 inches, and a length of 16.125 inches. The band 124 has an undulating or curving configuration having cylindrical, smooth surfaces 132 on inner wall 126 adjacent to and above each fluid container support area 114 and corresponding to the rounded sides of the containers 102 to be supported on the areas. The floor 104 also has an undulated perimeter design curving outwardly at locations 134 at each outer fluid container support area 114 for conforming generally to the cylindrical configuration of the bottom portions of the fluid containers 102.

Figure 7:
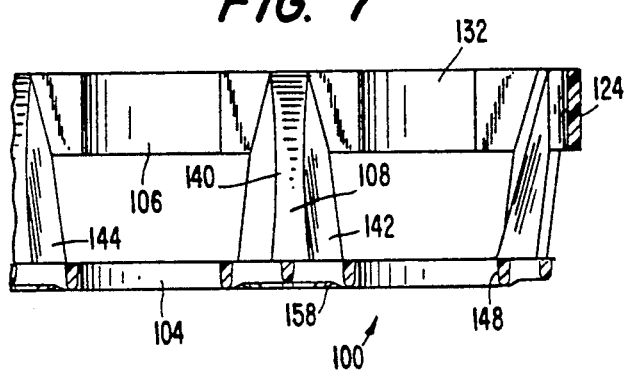
FIG. 7 is a cross-sectional view taken along line 7—7 of FIG. 2.
Figure 8:
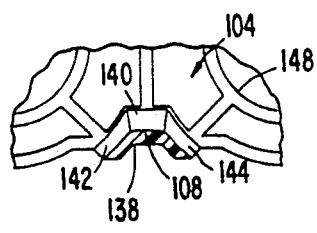
FIG. 8 is a cross-sectional view taken along line 8—8 of FIG. 4.
Figure 9:
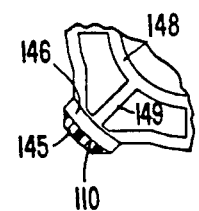
FIG. 9 is a cross-sectional view taken along line 9—9 of FIG. 5.
Figure 10:
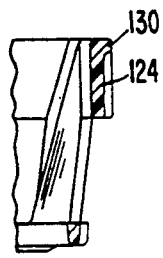
FIG. 10 is a cross-sectional view taken along line 10—10 of FIG. 2.
Figure 11:
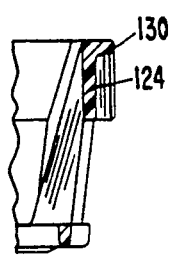
FIG. 11 is a cross-sectional view taken along line 11—11 of FIG. 2.
Figure 12:
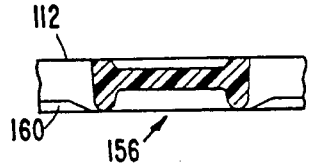
FIG. 12 is a cross-sectional view taken along line 12—12 of FIG. 2.
Figure 13:
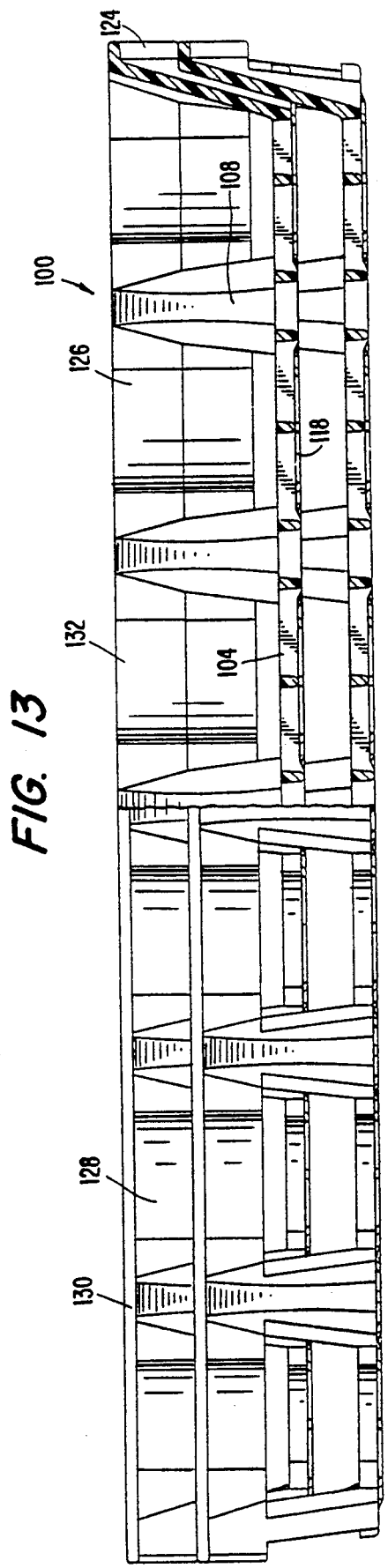
FIG. 13 is a side elevational view, with portions thereof broken away, of the first tray in an empty and nested position.

The columns 108 extend upwardly from the floor 104 to the rail 106 and between each of the support areas 116 where the undulating perimeter curves in at location 136. These columns 108 are each formed as a generally truncated conical member defining a vertical slot 138 disposed outwardly relative to the floor 104. The inwardly disposed surfaces of the columns 108 have three faces, each of which angles upwardly and outwardly from the floor to the rail. The middle face 140 is flat, and the outer two faces 142, 144 are generally sidewardly oriented and have truncated conical configurations. The configuration of these faces can be seen, for example, in FIGS. 1, 6, 7, and 8. Surface face 142 as shown in FIG. 7 is constructed from a cone having a base radius of 1.300 inches, an incline of ten degrees per side and a wall thickness of 0.100 inch. The inward surfaces of the columns 108 are thus generally conically shaped, angling towards the longitudinal center line thereof, and the cans 102, even when held loose, do not contact the immediately adjacent columns even during normal transport movement of the tray 100. The slots 138 are correspondingly configured to receive up thereinto the inner surfaces of columns of another tray as shown in FIG. 13, to provide a deeply nested arrangement. Each additional empty tray 100 then adds only the narrow height of its rail 106 to the stack of empty nested trays, which additional height is only about three-quarters of an inch.

The corner support posts 110 are also angled inwardly and downwardly and have conical outer and inner surfaces 145, 146 (same as the columns—see FIG. 9) to slide along and relative to one another when the trays are sliding into and out of their empty nested position which is depicted in FIG. 13.

The upper floor surface 112 can be smooth and planar across its entire expanse. Alternatively, it can have indents or recessed areas at each of the support areas 114 for receiving therein the bottoms of each of the fluid containers 102; or it can have low height divider ribs on the surface thereof, separating the support areas 114 as will be explained later with reference to FIGS. 31-43.

A preferred design is to mold the floor 104 with a gridwork like configuration having a pattern of open spaces therethrough, as shown in FIGS. 1-3 (and 26-28), so that less plastic floor material is needed. The floor 104 is thereby made cheaper and lighter, and an attractive design is thereby presented. This gridwork like design preferably comprises a plurality of circular members 148, one for each support area 114. Each of these circular members 148 is slightly smaller than the bottom of the fluid containers 102 to be supported thereon. A plurality of radial struts 149 extends radially out from each of the circular members 148 to suspend or support them. The circular members 148 are arranged in rows and columns to thereby define one or more arrays, as illustrated in FIG. 2 for example. In the preferred design of FIGS. 1-14 (and 26-30) there are four two-by-three arrays to accommodate four six-packs of cans; in other words, there are twenty-four support areas 114 in a four-by-six arrangement. The circular members 148 form a strong support structure and make it relatively easy to count the number of support areas 114 in an empty tray 100 and also to position the fluid containers 102 on the floor 104.

The gridwork floor 104 also comprises a plurality of longitudinal and lateral struts 150, 152, extending (discontinuously) the full length and width, respectively, thereof and between the rows and columns of the circular members 148. The radial struts 149 then extend to or through these lateral and longitudinal struts. At the intersections of the longitudinal and lateral struts 150, 152 smaller circular members 154 are formed and are thereby positioned in the center of a square of the larger circular members 148 as can be seen in FIGS. 2 and 3, for example. One interesting pattern extends the central longitudinal strut 150 through each of the smaller circular members 154 except for the center one 156 (FIG. 12) and the central lateral strut 152 through the centers of each of the smaller circular members 154 except for the center one 156, and the remaining smaller circular members 154 then are fully open.

The floor bottom surface 116 is recessed upwardly at each receiving area 118 for receiving thereinto the tops of fluid containers 102 in a layer in a tray 120 beneath the floor 104 in a preferred design of this invention. These recessed receiving areas are shown for example in FIGS. 3, 7, and 13 and can be understood from comparing the tops of the bottom left two cans with the right two cans in FIG. 14. Each recess 158 is formed simply by having the bottom surfaces of radial struts 149 angling from locations 158 (FIGS. 3 and 7) spaced a slight distance from the larger circular members 148 to the larger circular members and locations 160 (FIGS. 3, 6 and 12) spaced from circular members 154. Any similar construction for holding the floor bottom surface 116 to the tops of a bottom container layer therebeneath, as would be apparent to those skilled in the art, to prevent free sliding is within the scope of this invention.

Looking at the ends and sides of the tray 100, it is seen that the areas between adjacent columns 108 and the floor 104 and the rail 106 define open spaces 162. This design requires less plastic then a more solid design and thereby is lighter, cheaper and more attractive. It further allows the fluid containers 102 therein to be more completely seen, especially when loaded or partially loaded trays are stacked one on top of the other, as shown in FIG. 14.

Figure 15:
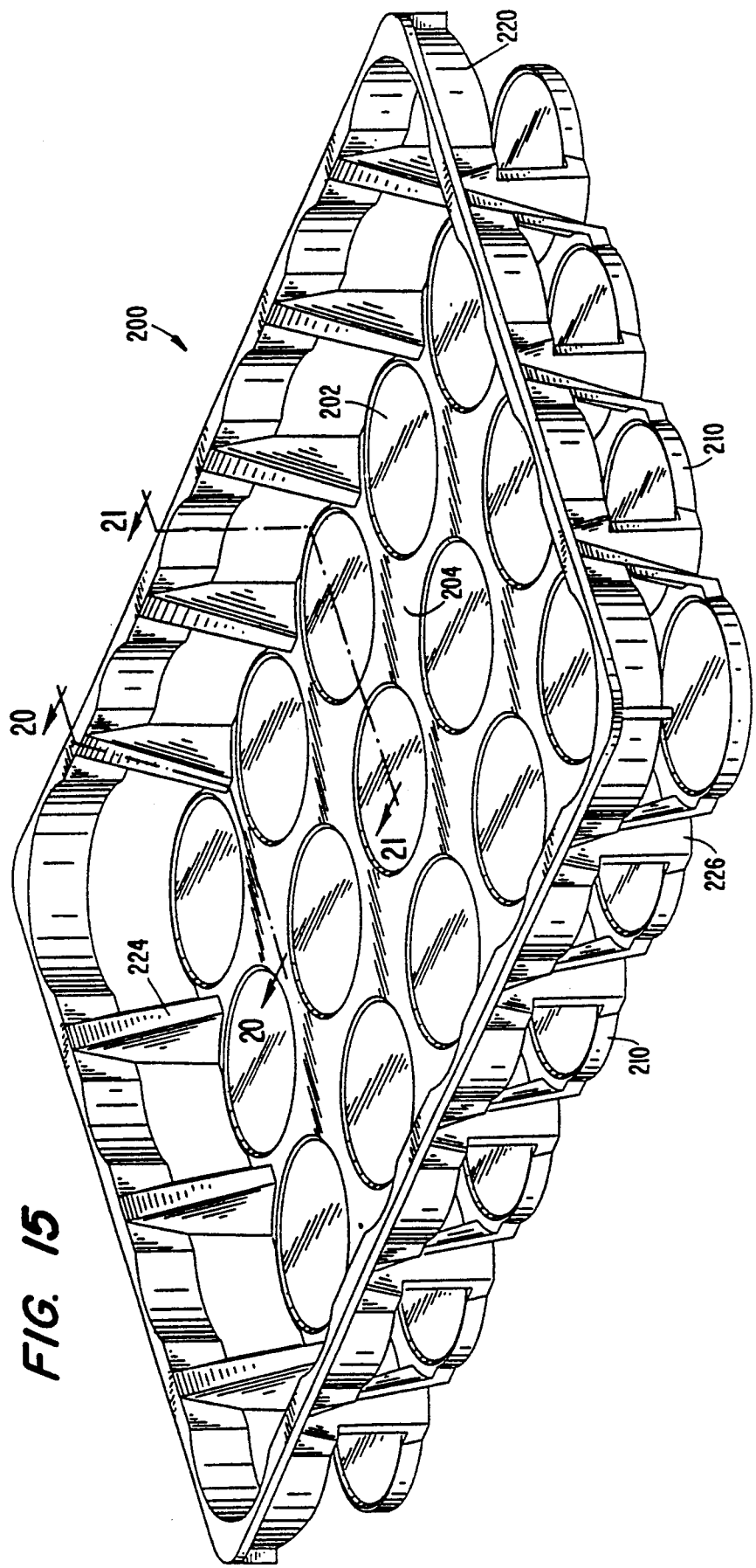
FIG. 15 is a top perspective view of a second tray of the present invention.
Figure 16:
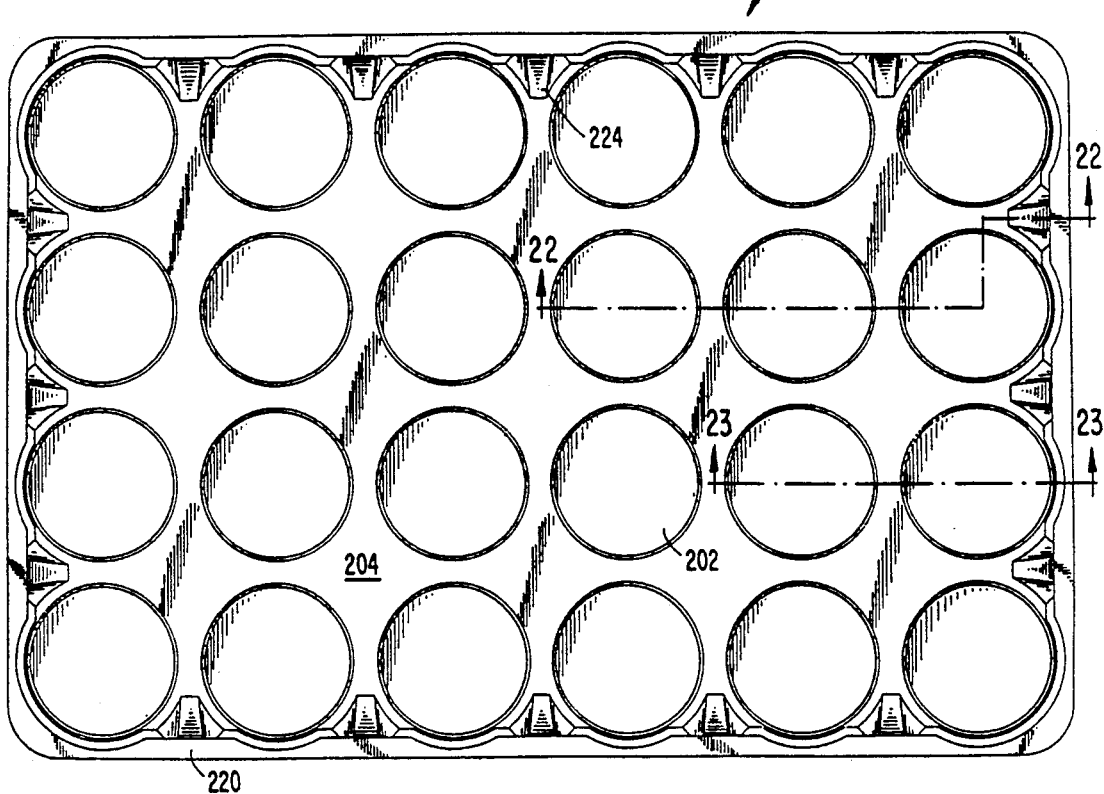
FIG. 16 is a top plan view of the second tray.
Figure 17:
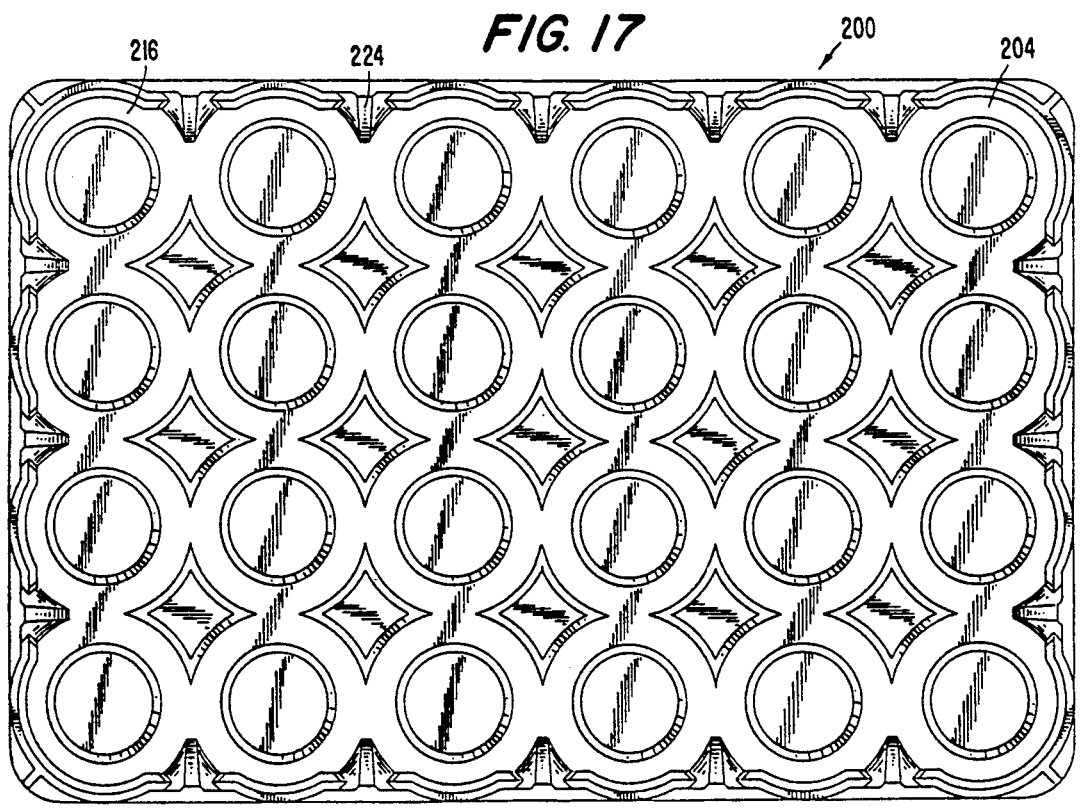
FIG. 17 is a bottom plan view of the second tray.
Figure 18:
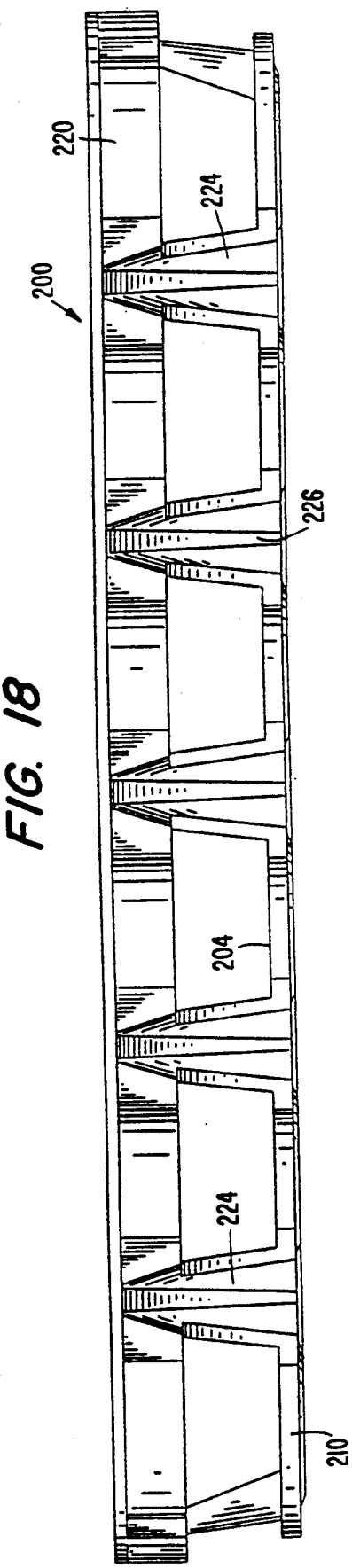
FIG. 18 is a side elevational view of the second tray.
Figure 19:
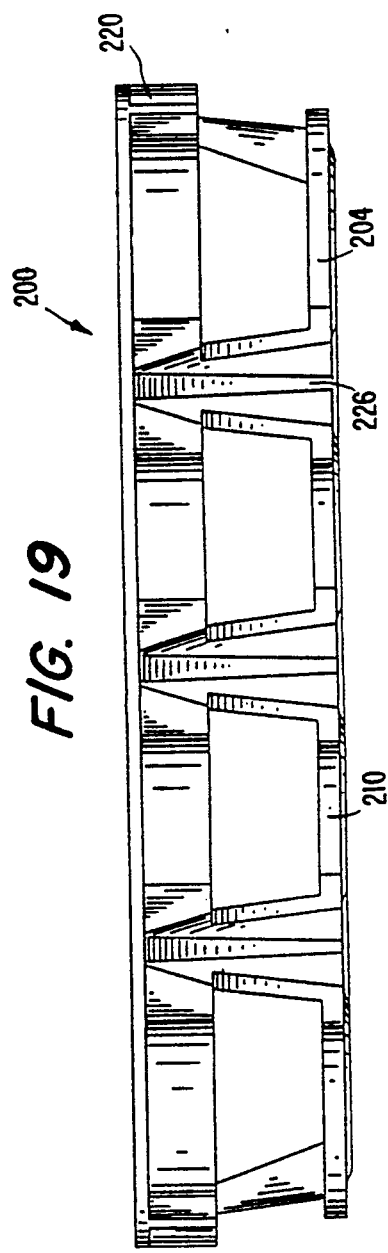
FIG. 19 is an end elevational view of the second tray.
Figure 20:
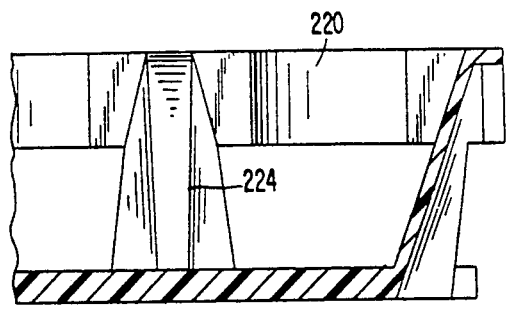
FIG. 20 is a cross-sectional view taken along line 20—20 of FIG. 15.
Figure 21:
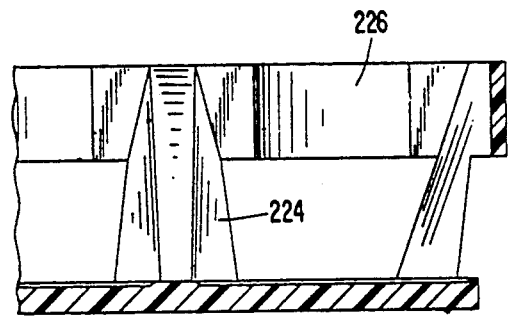
FIG. 21 is a cross-sectional view taken along line 21—21 of FIG. 15.
Figure 22:
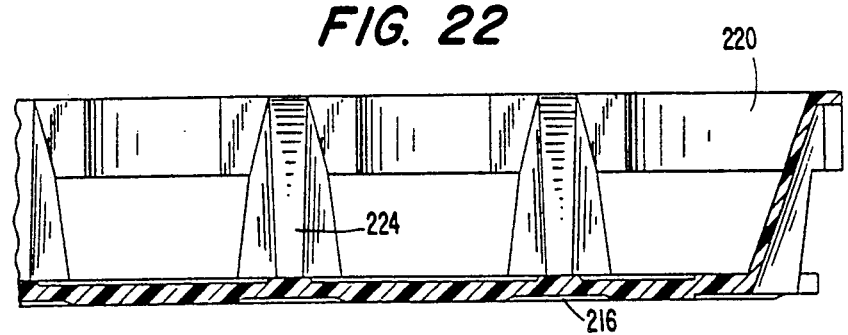
FIG. 22 is a cross-sectional view taken along line 22—22 of FIG. 16.
Figure 23:
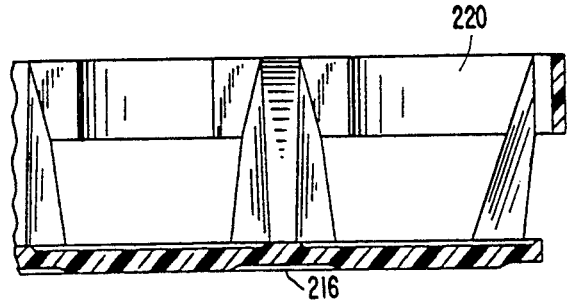
FIG. 23 is a cross-sectional view taken along line 23—23 of FIG. 16.
Figure 24:
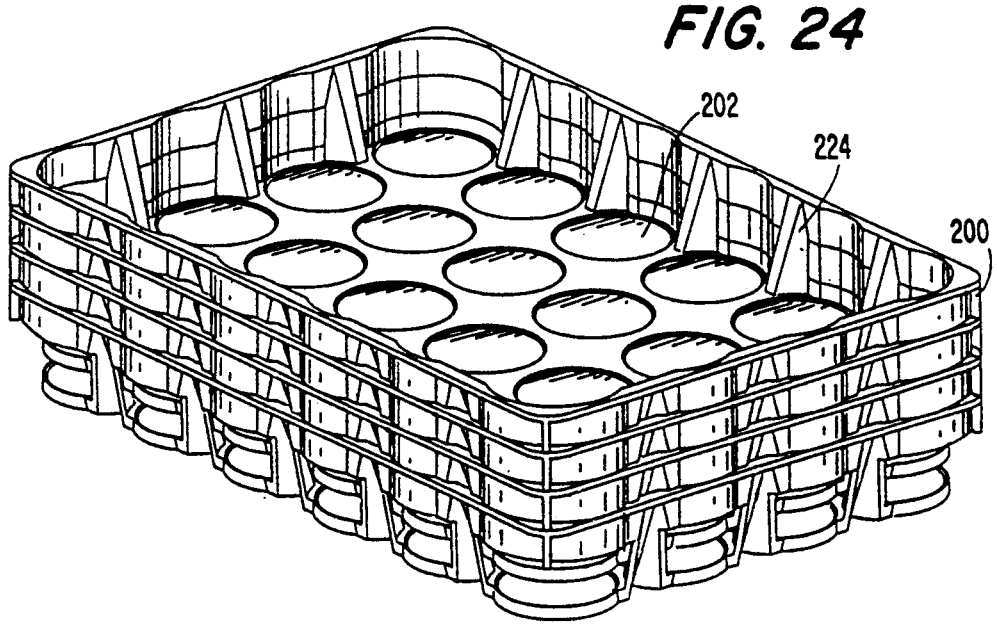
FIG. 24 is a top perspective view of the second tray shown in an empty and nested position.
Figure 25:
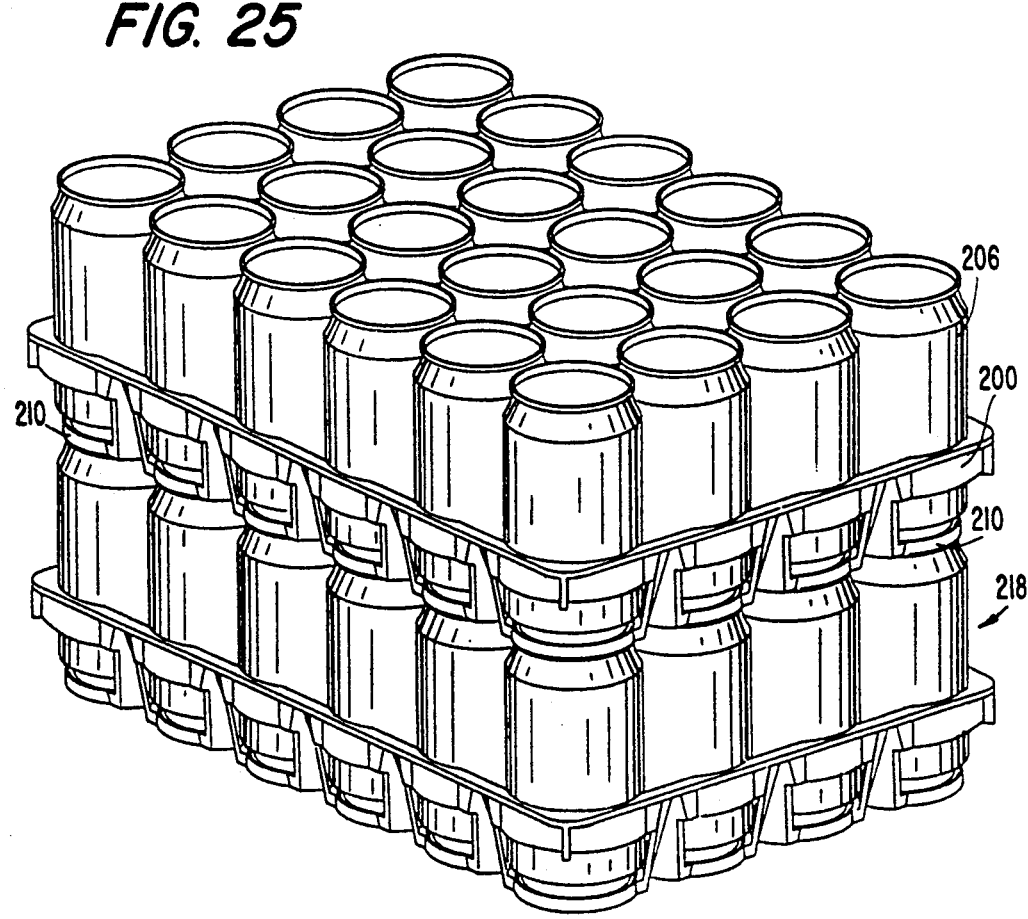
FIG. 25 is a top perspective view of the second tray shown in a loaded and stacked position.
Figure 26:
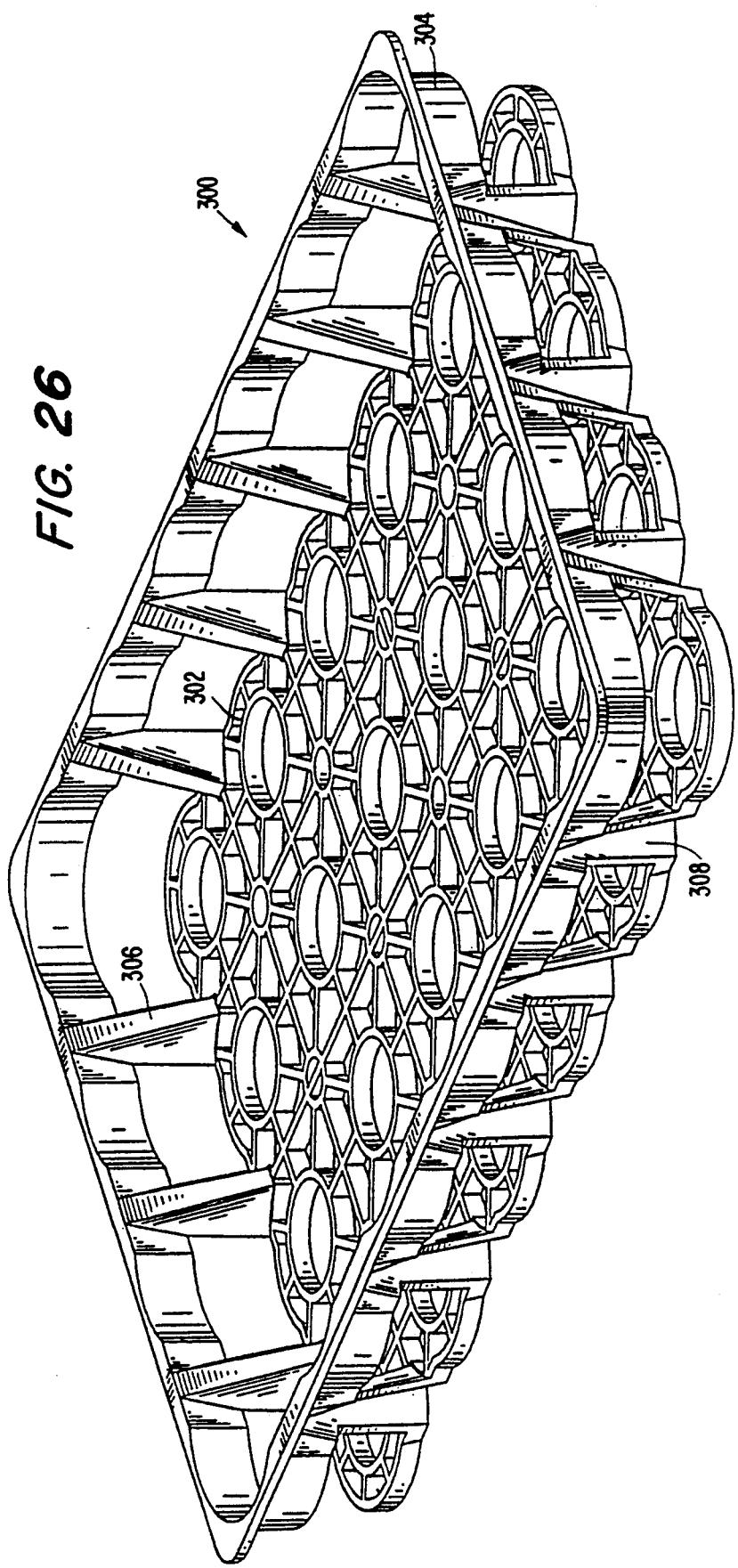
FIG. 26 is a top perspective view of a third tray of the present invention.
Figure 27:
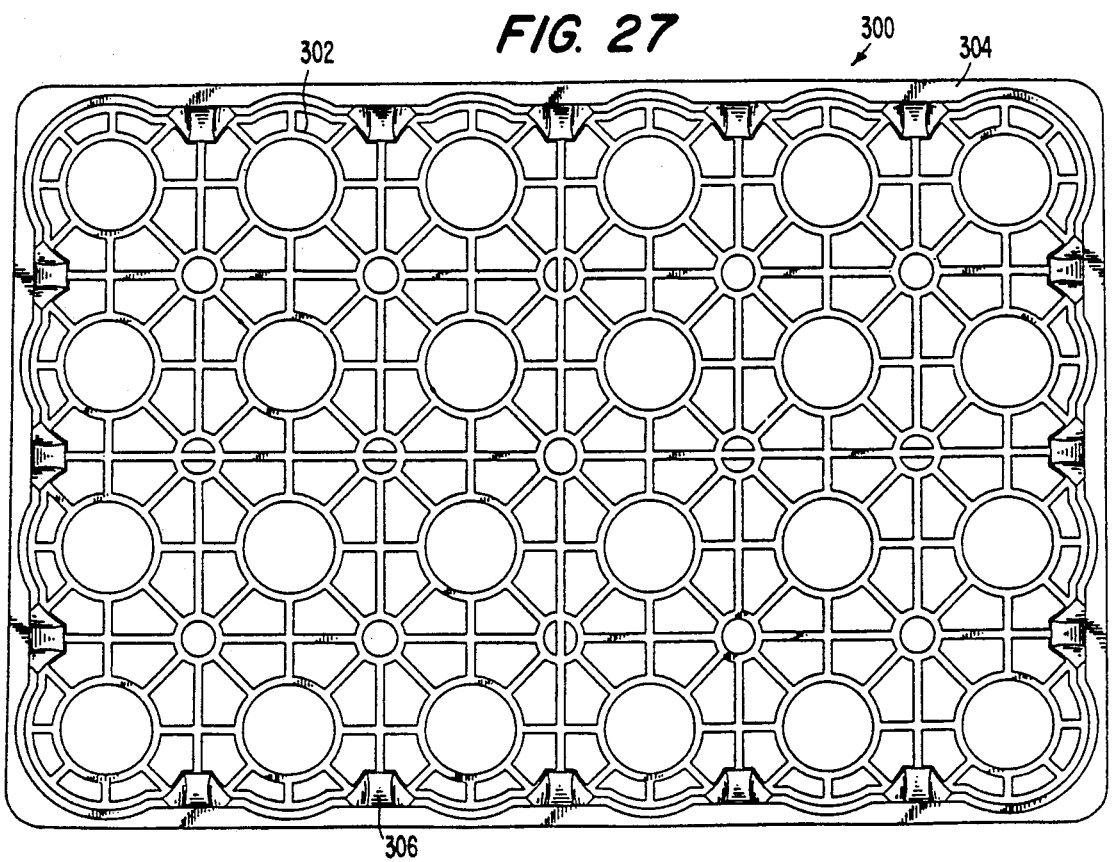
FIG. 27 is a top plan view of the third tray.
Figure 28:
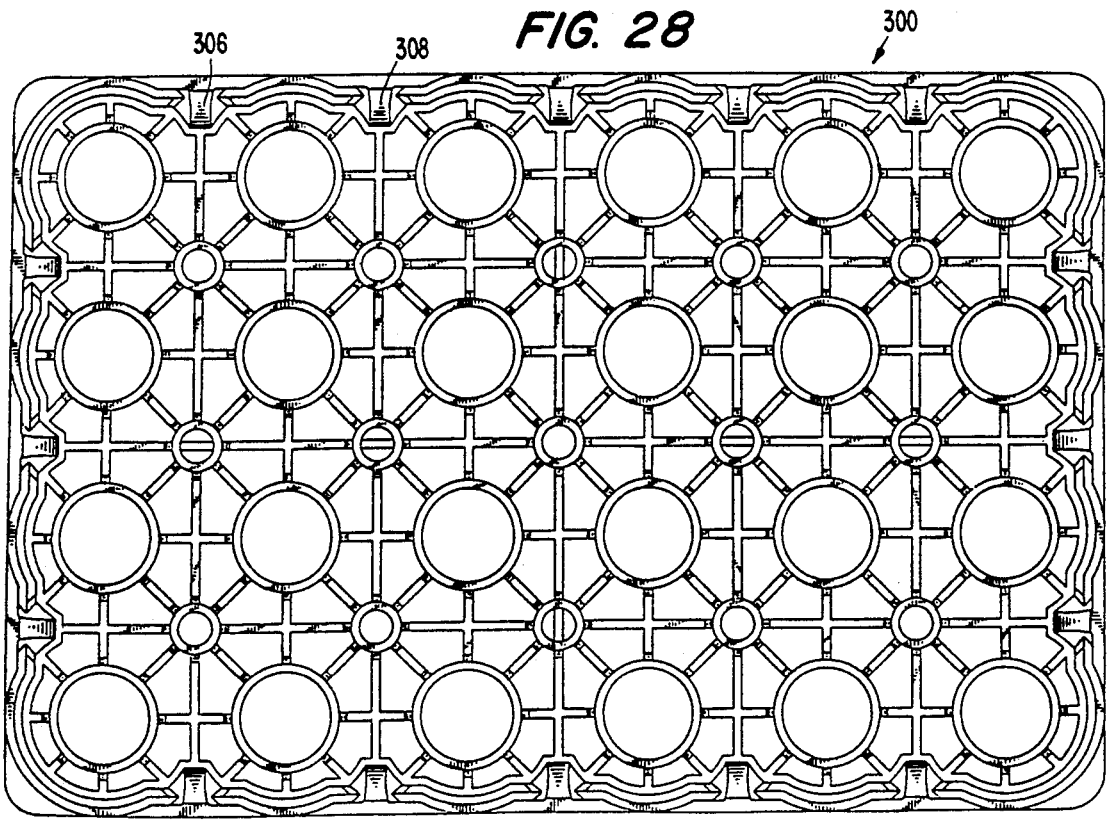
FIG. 28 is a bottom plan view of the third tray.
Figure 29:
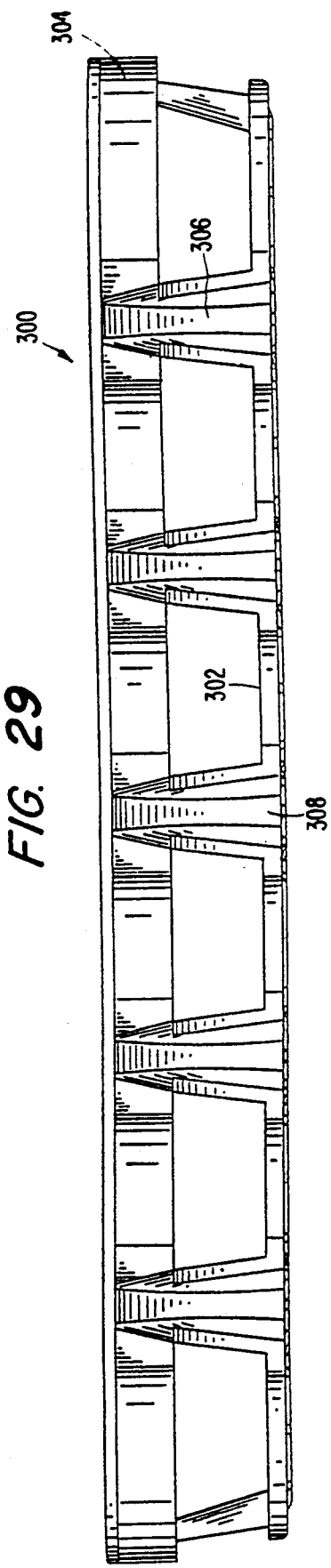
FIG. 29 is a side elevational view of the third tray.
Figure 30:
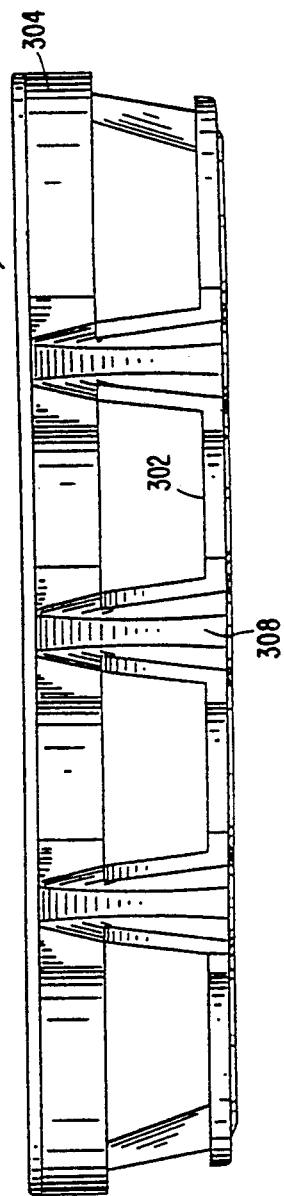
FIG. 30 is an end elevational view of the third tray.
Figure 31:
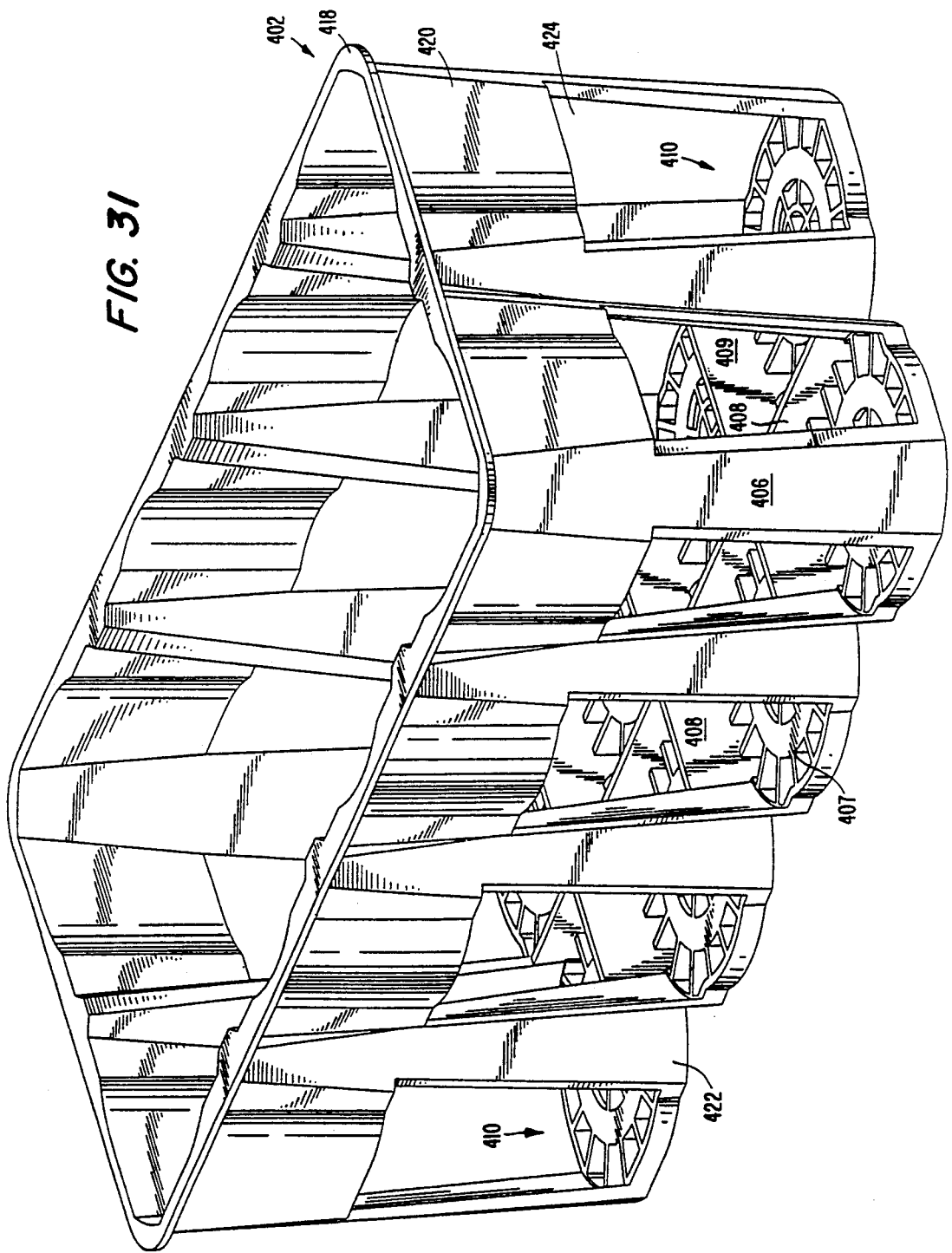
FIG. 31 is a top perspective view of a fourth tray of the present invention.
Figure 32:
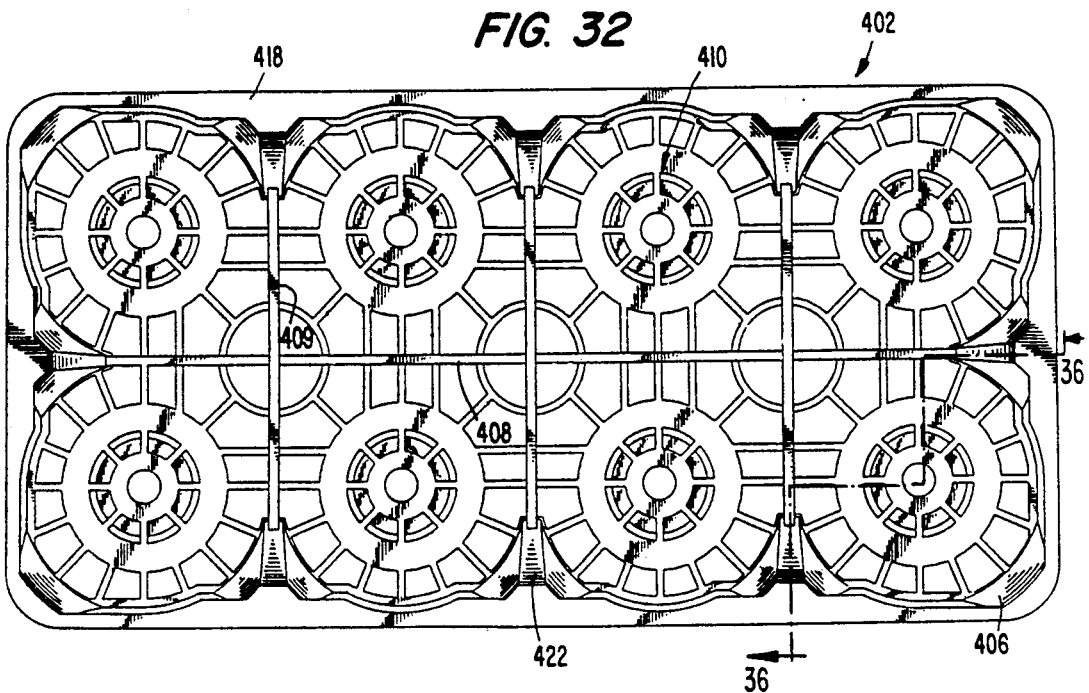
FIG. 32 is a top plan view of the fourth tray.
Figure 33:
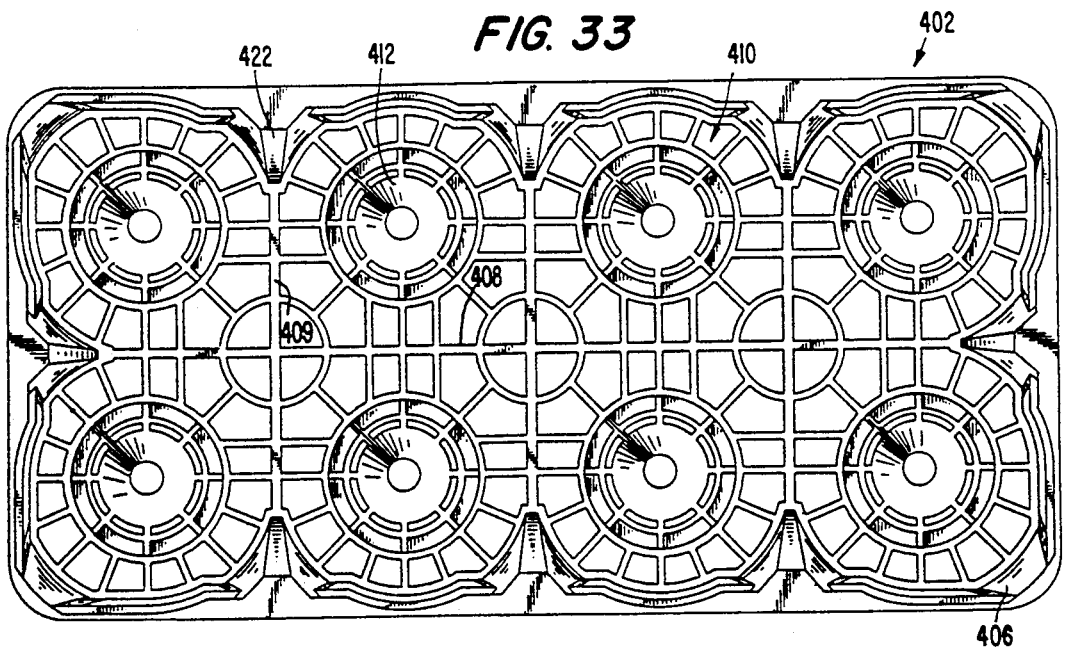
FIG. 33 is a bottom plan view of the fourth tray.
Figure 34:
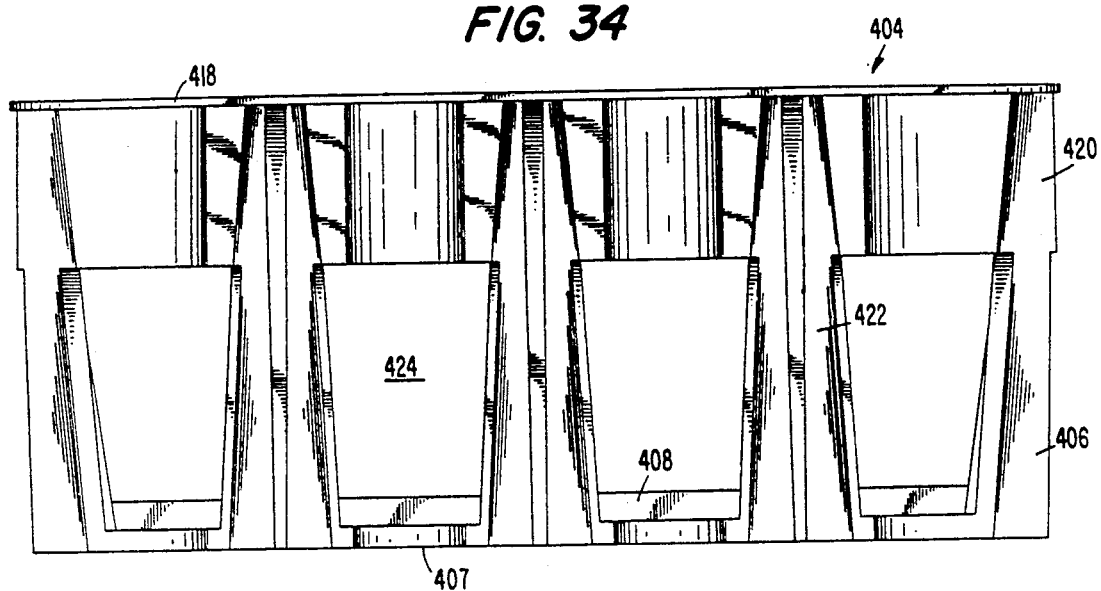
FIG. 34 is a side elevational view of the fourth tray.
Figure 35:
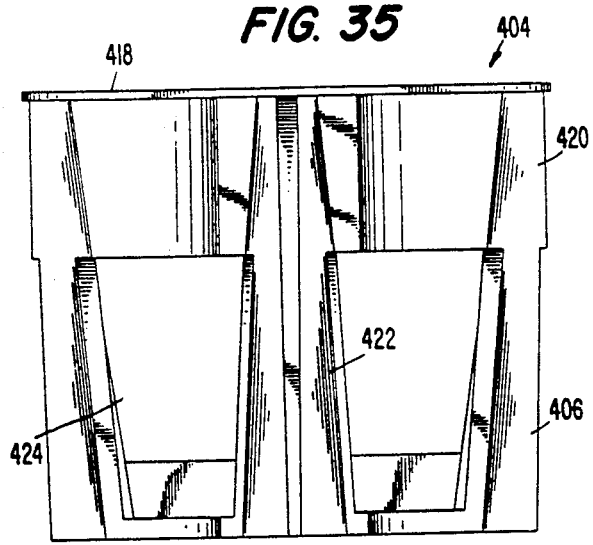
FIG. 35 is an end elevational view of the fourth tray.
Figure 36:
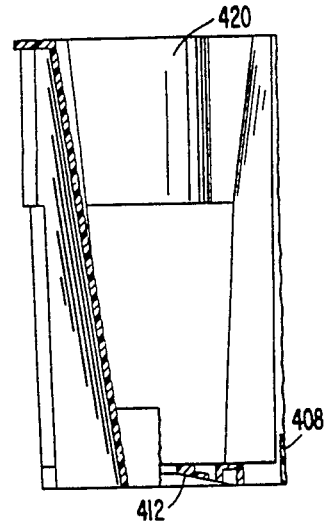
FIG. 36 is a cross-sectional view taken along line 36—36 of FIG. 32.

An alternative design of the present invention uses a "solid" floor configuration instead of the open gridwork-like design of tray 100. A solid design is illustrated by the tray shown generally at 200 of FIG. 15, for example, wherein a plurality of circular recesses 202 is formed in the upper surface of the floor 204 for receiving therein the bottom edges of the fluid containers or metal beverage cans 206. When viewed from the top as in FIG. 16 a plurality of rings is thereby defined. From the sides as shown in FIGS. 18 and 19, the perimeter of the floor 204 then is similar to the configuration of the floor 104 of tray 100 and comprises a series of arcuate surfaces 210. The bottom surface of the floor 204, as shown in FIGS. 17 and 22, has circular recesses 216 formed up thereinto for receiving therein the top rims of the cans 206 and thereby preventing free sliding of an upper loaded tray 200 on a similar bottom loaded tray as shown generally at 218 in FIG. 25. Tray 200 similarly has a rail 220, and angled columns 224 between the arcuate surfaces 210 and defining outward slots 226. Although tray 200 does not have any corner support posts, it is within the scope of this invention to provide such support posts for the FIG. 15 embodiment similar to those shown in FIG. 1.

The tray as shown generally at 300 in FIGS. 26-30 is a hybrid of trays 100 and 200. It has the gridwork like floor 302 of tray 100 and like tray 200 does not have any corner support posts. Similar to trays 100 and 200 it has a rail 304 and angled columns 306 defining outwardly-disposed receiving slots 308. Thus, the tray 300 of FIG. 26, for example, can receive therein loose (or packaged as with a thin plastic film or an upper plastic holder) cans or similar containers in an array, such as a four-by-six array, and hold them securely, preventing them from tipping or rubbing against each other even during the movements normally associated with the transport and handling thereof. The trays 300, when loaded, also securely stack one on top of another as can be understood from FIG. 25. The trays 300 when empty can be nested one on top of the other for storage or transport, and similar to trays 100 and 200, each empty tray 300 adds only the narrow height of its rail 304 to the stack of empty trays when nested therein.

The general concept of this invention can be easily adapted for handling other containers of different sizes and shapes. An example is illustrated in FIGS. 31 through 43 for two-liter PET bottles, such as are shown at 400 in FIG. 38, wherein two embodiments are illustrated, the first shown generally at 402 in FIGS. 31 through 38 and the second shown generally at 404 in FIGS. 39 through 43. The only difference between them is the inclusion of the corner support posts 406 in the embodiment of FIG. 31. The posts 406 serve a similar outer support function for the overhanging support area corners of the floor 407.

Longitudinal and lateral divider struts 408, 409 extend across and along the floor 407 to separate the individual support areas 410 from each other to hold the bottles 400 better in place and to prevent them from tipping. The three lateral divider struts 409 are taller than the single longitudinal strut 408. This holding function is more important for the plastic bottles 400 than it is for the can trays 100, 200, 300 because of the greater likelihood that the tall, flexible bottles 400 will buckle if they tip when stacked. The trays (or carriers) 402, 404 of FIGS. 31 through 43 are designed to support and carry eight bottles 400. It is, of course, within the scope of the present invention to size the trays 402, 404 differently to carry either more or fewer bottles, or bottles of different sizes.

Figure 37:
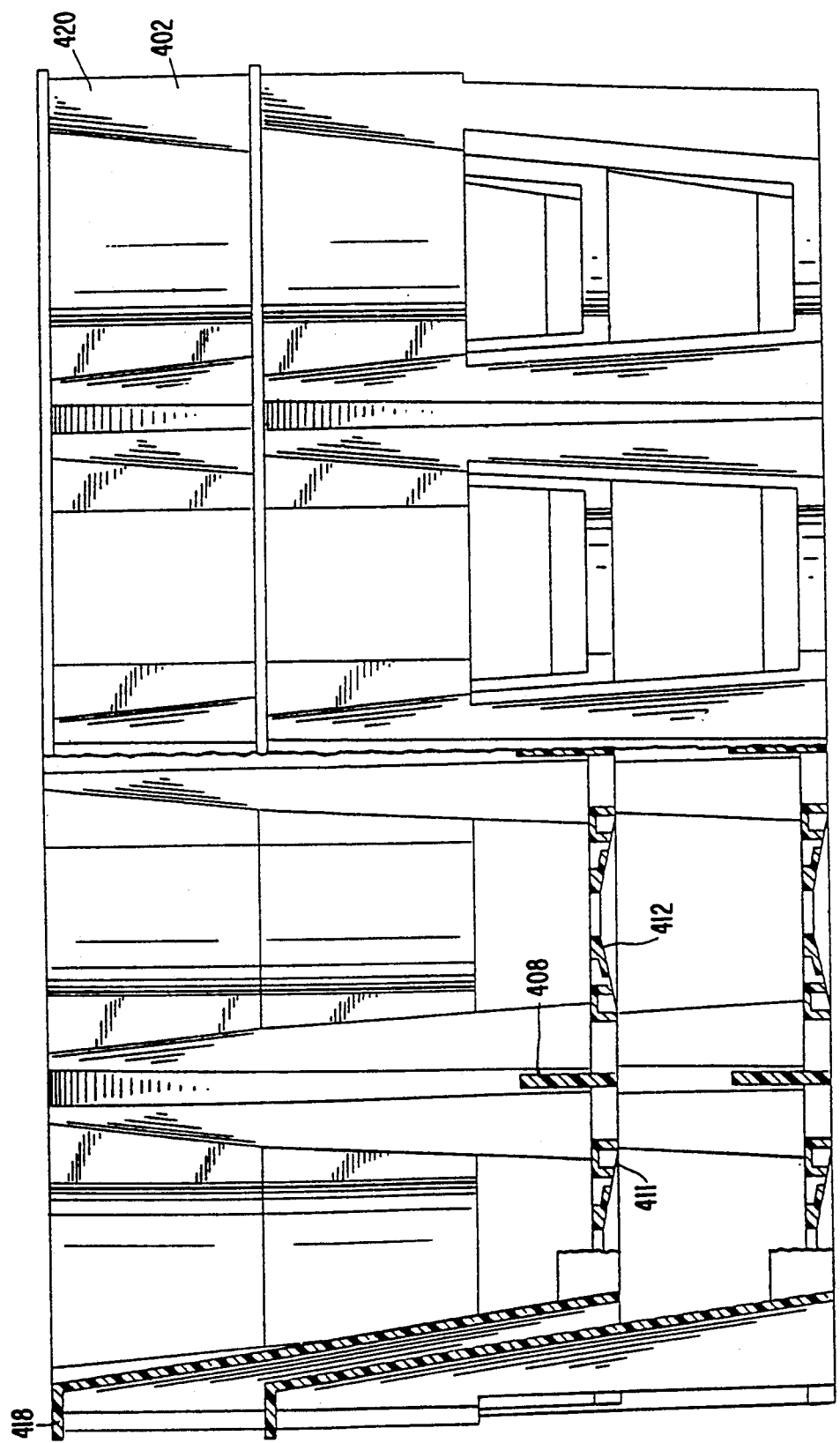
FIG. 37 is a side elevational view, with portions thereof broken away, of the fourth tray shown in an empty and nested position.
Figure 38:
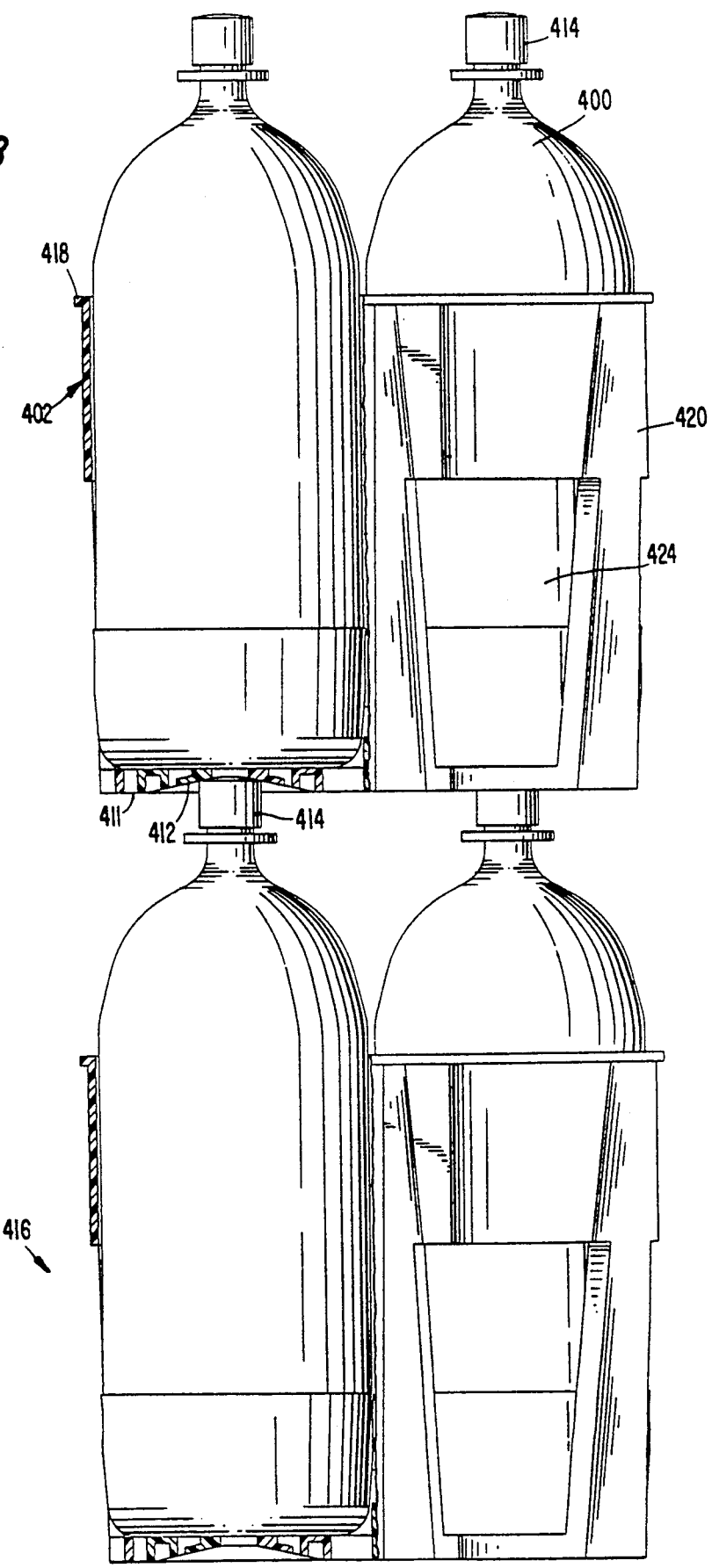
FIG. 38 is a side elevational view, with portions thereof broken away, of the fourth tray in a loaded and stacked position.
Figure 39:
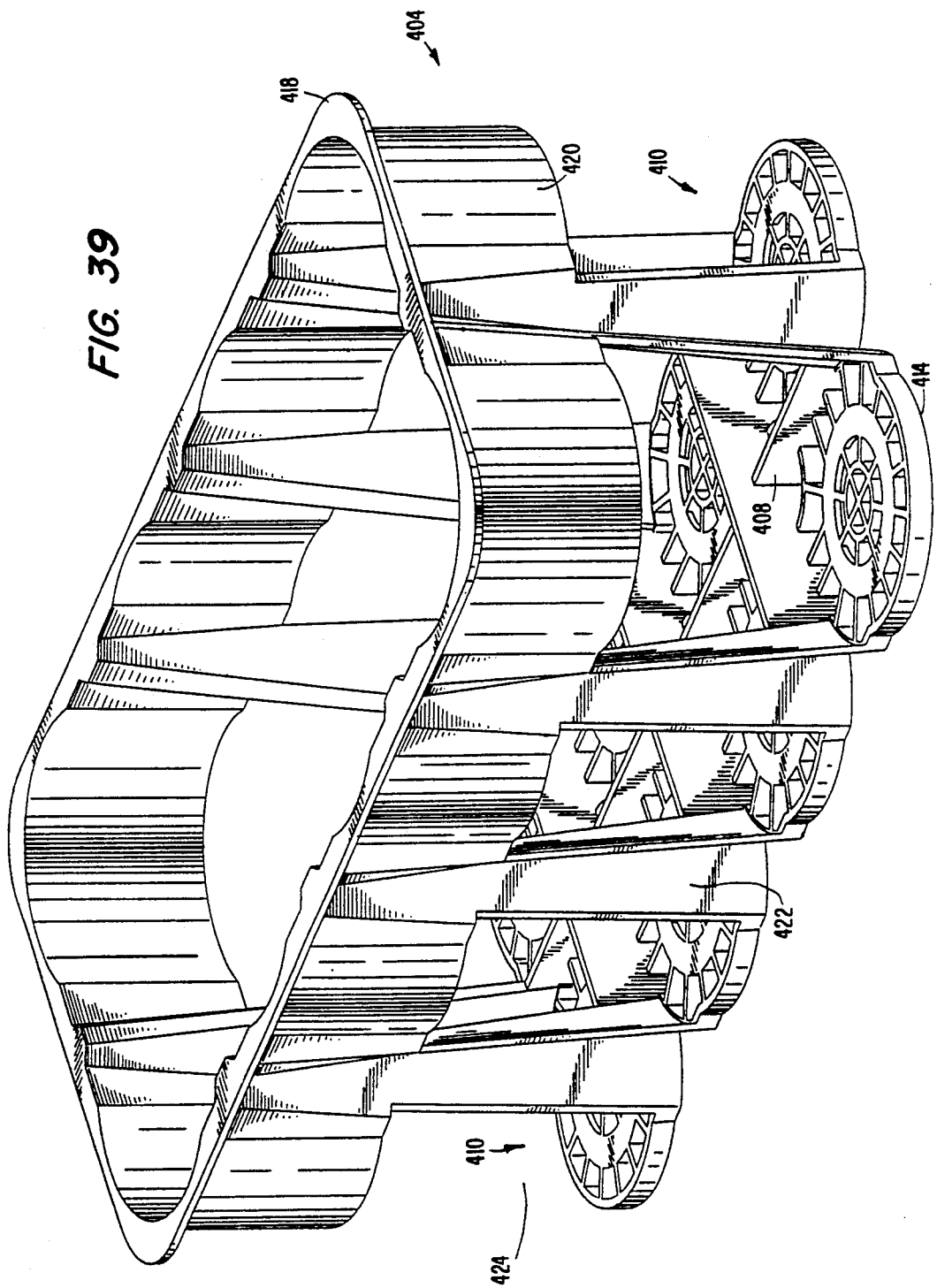
FIG. 39 is a top perspective view of a fifth tray of the present invention.
Figure 40:
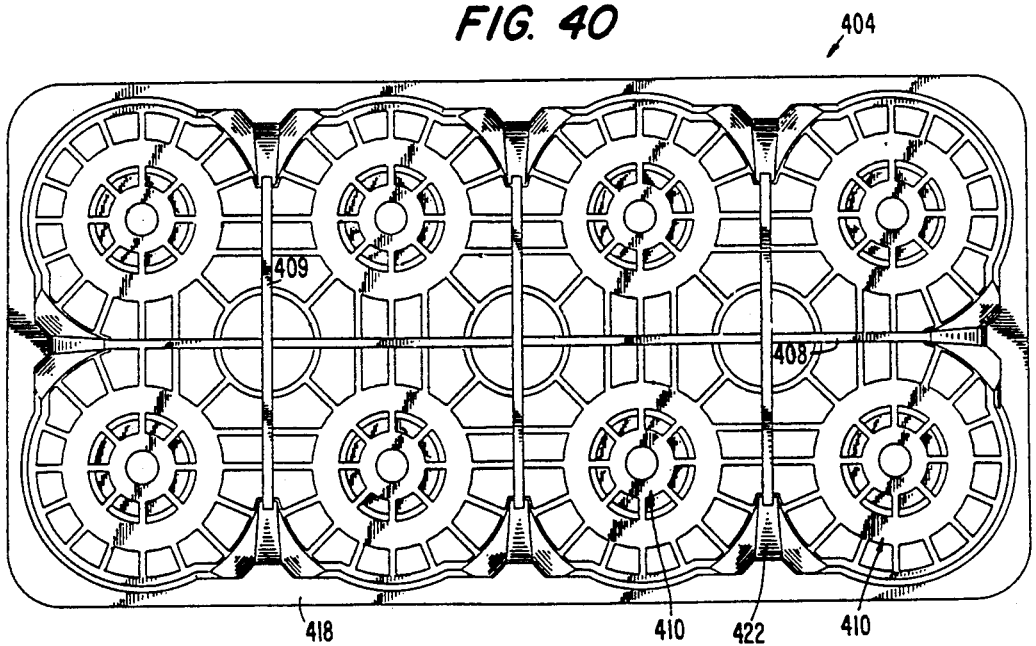
FIG. 40 is top plan view of the fifth tray.
Figure 41:
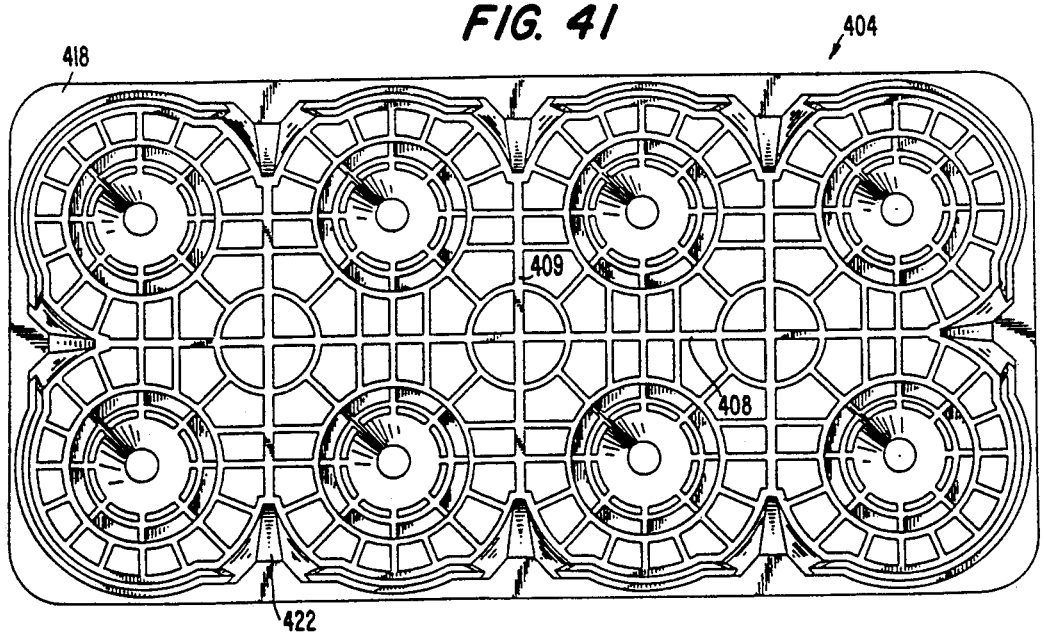
FIG. 41 is a bottom plan view of the fifth tray.
Figure 42:
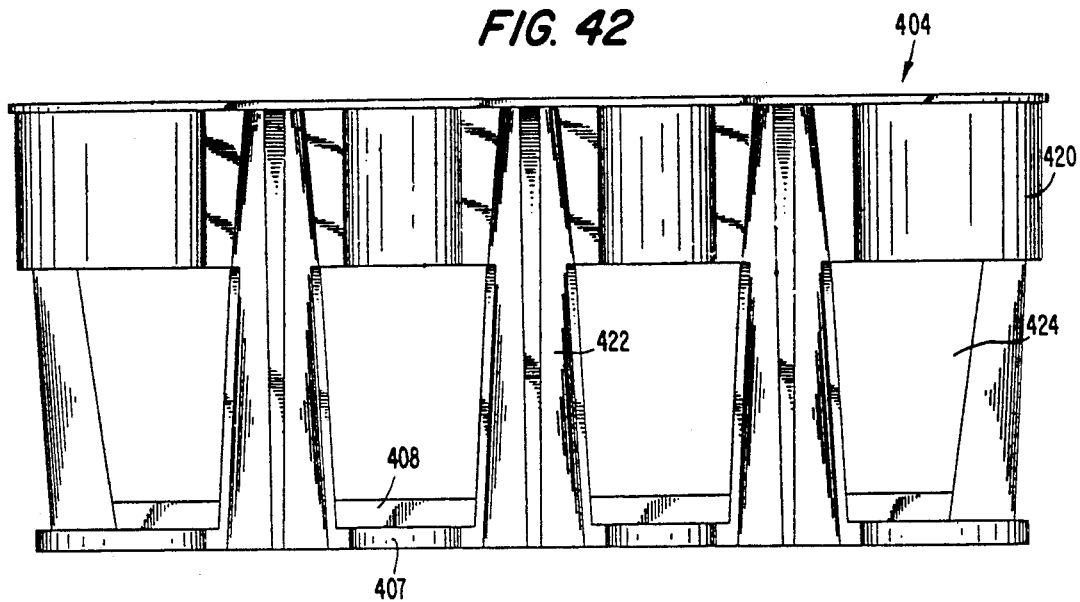
FIG. 42 is a side elevational view of the fifth tray.
Figure 43:
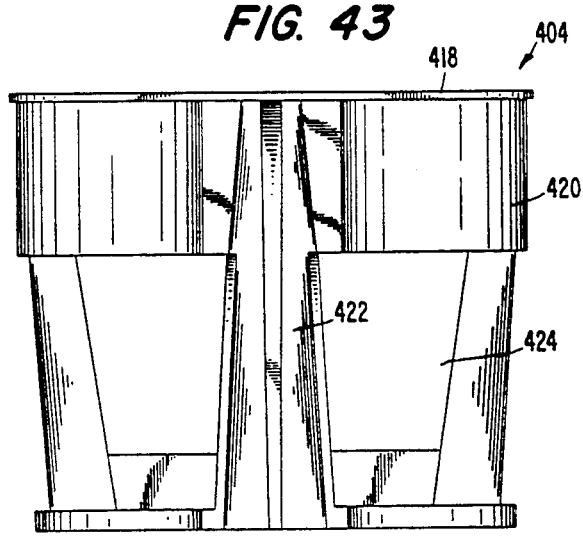
FIG. 43 is an end elevational view of the fifth tray.

The bottom tray surfaces 411 are recessed in rounded configurations, such as is shown in FIGS. 37 and 38 by the recess areas 412, to receive up thereinto the caps 414 of the bottles 400 on a lower tray as shown generally at 416. This prevents the upper loaded tray 402 from freely sliding along the top of the bottles in a tray 416 beneath it and makes it less likely that the bottles in the lower tray 416 will tip. When in an empty nested arrangement, the upper tray fits into the lower tray so that the rail lip 418 of the lower tray is at the bottom of the rail or band 420 of the upper tray, as best shown in FIG. 37. As can be appreciated from FIGS. 31 and 39, the area between adjacent columns 422 or columns 422 and adjacent posts 406 and between the floor 408 and the rail 420 define open spaces 424 for reasons discussed above relative to trays 100, 200 and 300 and allow the bottles 400 therein to be easily seen from the sides. The bottles 400 can thus be identified as to type and also easily and readily seen to determine whether the tray is fully loaded.

The columns of any of the trays 100, 200, 300, 402 or 404 can be understood or described in either of two ways. One way is that they extend only from the bottom surface of the floor, up to the lower edge of the rail or band, as can be best appreciated from an outside side view especially when in an empty nested arrangement. Thus, the band extends continuously the entire circumference of the tray and includes the upper extensions of the slots of the columns. Another way is that the columns themselves extend all the way to the top of the rails or to the lip, which is better appreciated when looking at the inside of the trays such as shown in the empty perspective views. In the latter case the band can be considered to comprise a plurality of band segments extending between adjacent columns. Either way an improved sturdy compact tray which is inexpensive to manufacture and handle is defined. The tray when empty are easily and deeply nestable one within the other without any undue manipulation or orientation thereof. They have attractive and open designs allowing the containers therein to be more fully displayed.

From the foregoing detailed description, it will be evident that there are a number of changes, adaptations and modifications of the present invention which come within the province of those skilled in the art. However, it is intended that all such variations not departing from the spirit of the invention be considered as within the scope thereof as limited solely by the claims appended hereto.

What is claimed is:

1. A low depth, nestable tray comprising:
   a tray floor having a top surface with an array of fluid container support areas thereon, each said support area being configured for vertically upright supporting a separate fluid container having a right circular cylindrical vertical side wall, said floor having a bottom surface with an array of receiving areas for receiving thereon the tops of similar fluid containers in at least one similar tray beneath said floor;
   a low-depth tray rail spaced above and generally parallel to said floor, said rail being positioned relative to said floor such that the tops of the fluid containers supported on said support areas extend a distance above a top surface of said rail and thereby in a low-depth arrangement;
   wherein said rail has an inboard rail surface, disposed inboard relative to said floor;
   wherein said inboard rail surface has thereon a plurality of vertically upright, right circular cylindrical surfaces, each conforming to the shape of the cylindrical side walls of the fluid containers supported vertically upright on adjacent said support areas, to thereby provide lateral support along the lengths of said cylindrical surfaces for the adjacent fluid containers against their cylindrical side walls; and
   a plurality of nesting columns extending down from said rail and angling downwardly and inwardly to and connecting with said floor, said columns being spaced around an outer perimeter of said floor and defining open through-spaces between adjacent said columns.

2. The low depth, nestable tray of claim 1 wherein each said column forms a longitudinal, outboardly disposed nesting slot centrally thereon, outboardly disposed relative to said floor.

3. The low depth, nestable tray of claim 2 wherein said rail includes an outboardly disposed lip on top of said rail, and each said slot engages at upper ends thereof said lip.

4. The low depth, nestable tray of claim 2 wherein said slot is configured so as to receive up thereinto a corresponding column of a similar tray such that said rail and the rail of the similar tray are one on top of another when said tray and the similar tray are empty nested together in a nested position.

5. The low depth, nestable tray of claim 2 wherein said rail has its outer surface recessed inwardly above each said longitudinal slot and defining the upper extension thereof.

6. The low depth, nestable tray of claim 2 wherein said rail includes a top lip and said slots engage at upper ends thereof said top lip.

7. The low depth, nestable tray of claim 2 wherein said slots are angled downwardly and inwardly from said rail to said floor.

8. The low depth, nestable tray of claim 7 wherein said slots open up into and engage said bottom surface of said floor.

9. The low depth, nestable tray of claim 2 wherein said slots are upwardly tapering.

10. The low depth, nestable tray of claim 2 wherein said slots engage said bottom surface of said floor.

11. The low depth, nestable tray of claim 2 wherein each said nesting slot is fully enclosed along both longitudinal sides thereof.

12. The low depth, nestable tray of claim 2 wherein each said nesting slot defines in horizontal cross-section a V-like shape.

13. The low depth, nestable tray of claim 1 wherein said rail comprises an upright band whose outboard and inboard surfaces are vertically disposed.

14. The low depth, nestable tray of claim 13 wherein said rail comprises a lip secured on top of said upright band and extending outwardly from said outside surface.

15. The low depth, nestable tray of claim 13 wherein said band generally defines a rectangle with undulating upright walls and rounded corners.

16. The low depth, nestable tray of claim 1 wherein said floor includes a plurality of upright divider walls extending upwardly from said top surface and separating said support areas.

17. The low depth, nestable tray of claim 1 wherein said rail includes an upper, generally rectangular, outwardly disposed lip.

18. The low depth, nestable tray of claim 1 wherein said rail defines a rectangle with rounded corners and having a width between outer edges thereof of ten and three-quarters inch and a length between outer edges thereof of sixteen and one-quarter inch.

19. The low depth, nestable tray of claim 18 wherein said columns are generally two inches high.

20. The low depth, nestable tray of claim 1 wherein said columns are positioned between adjacent said support areas and extend inwardly relative to and spaced from the fluid containers supported on adjacent said support areas so that the fluid containers do not rub against said columns.

21. The low depth, nestable tray of claim 1 wherein said rail includes an upper, outwardly disposed, generally rectangular lip secured on top of upper ends of said columns.

22. The low depth, nestable tray of claim 21 wherein said rail comprises a plurality of rail members extending between and connecting adjacent said columns and connected at upper ends thereof to said lip.

23. The low depth, nestable tray of claim 22 wherein said columns extend up to said lip.

24. The low depth, nestable tray of claim 1 wherein said support areas are recessed into said top surface for receiving therein the bottoms of the fluid containers.

25. The low depth, nestable tray of claim 1 wherein said rail defines at least part of a rectangle having rounded corners.

26. The low depth, nestable tray of claim 1 wherein said floor, said rail and said columns are integrally formed together.

27. The low depth, nestable tray of claim 1 wherein said array comprises a two-by-four array.

28. The low depth, nestable tray of claim 1 wherein said array comprises a four-by-six array.

29. The low depth, nestable tray of claim 1 wherein said rail has a total height of about three-quarters of an inch.

30. The low depth, nestable tray of claim 1 wherein said columns have three inward faces, the middle of which is flat, inboardly disposed and inwardly angled, and the outer two of which are generally sidewardly oriented and have truncated conical configurations.

31. The low depth, nestable tray of claim 30 wherein said three inward faces are configured and positioned so as to be spaced from the fluid containers on the adjacent said fluid container support areas.

32. The low depth, nestable tray of claim 1 wherein said floor includes on said top surface a ring-like member having a ring floor for each said fluid container support area for receiving and holding thereon the bottom of the fluid container.

33. The low depth, nestable tray of claim 1 wherein said floor comprises an open grid-work construction.

34. The low depth, nestable tray of claim 33 wherein said open grid-work construction includes a circular member for each said fluid container area and centrally positioned therein and a plurality of support struts extending radially out from each said circular member.

35. The low depth, nestable tray of claim 34 wherein said open grid-work construction includes longitudinal and lateral divider members between adjacent longitudinal and lateral rows, respectively, of said circular members.

36. The low depth, nestable tray of claim 35 wherein said longitudinal and lateral divider members extend between and connect oppositely disposed said columns.

37. The low depth, nestable tray of claim 35 wherein said open grid-work construction includes a plurality of interstitial circular members on said longitudinal and lateral divider members.

38. The low depth, nestable tray of claim 1 wherein said floor is rectangularly configured and has a pair of side edges and a pair of end edges, said array comprises a plurality of longitudinal rows and a plurality of lateral rows, and said columns are disposed between adjacent said longitudinal rows and adjacent said lateral rows at both said side and end edges.

39. The low depth, nestable tray of claim 1 wherein said rail is positioned above said floor a distance sufficient to prevent tipping of the fluid containers supported on said fluid container support areas.

40. The low depth, nestable tray of claim 1 wherein said receiving areas are recessed up into said bottom surface for receiving up thereinto the tops of the fluid containers in the similar tray therebeneath.

41. The low depth, nestable tray of claim 40 wherein the fluid containers are twelve-ounce metal cans, and said recessed receiving areas are configured to receive up thereinto the tops of twelve-ounce metal cans.

42. The low depth, nestable tray of claim 40 wherein the fluid containers are two-liter PET bottles, and said recessed receiving areas are configured to receive therein the tops of caps of two-liter PET bottles.

43. The low depth, nestable tray of claim 1 wherein said floor, said rail and said columns are integrally molded of polyethylene.

44. The low depth, nestable tray of claim 1 further comprising said rail being rectangular, and corner posts at each corner of said rectangular rail and extending downwardly and angling inwardly to said floor.

45. The low depth, nestable tray of claim 44 wherein each said corner post has a conical outward face disposed diagonally outward relative to said floor.

46. The low depth, nestable tray of claim 1 wherein said floor includes longitudinal and lateral cell divider struts between adjacent said fluid container support areas.

47. The low depth, nestable tray of claim 1 wherein said columns extend up along said inboard rail surface.

48. The low depth, nestable tray of claim 1 wherein said top surface of said floor is open across the entire length and width thereof between said columns.

49. The low depth, nestable tray of claim 1 wherein said columns each have a generally truncated conical shape.

50. The low depth, nestable tray of claim 1 wherein said inboard rail surface is vertically flat between said upright cylindrical surfaces and adjacent said columns.

51. The low depth, nestable tray of claim 1 wherein said rail forms a rectangle.

52. The low depth, nestable tray of claim 51 wherein said array comprises a plurality of columns and a plurality of rows.

53. The low depth, nestable tray of claim 51 wherein said tray is void of tray material and open across the entire length and width thereof in the plane of said rail between said end walls and between said side walls.

54. The low depth, nestable tray of claim 1 wherein said tray is void of tray material and open across the entire length and width thereof across said floor top surface between oppositely facing said columns.

55. The low depth, nestable tray of claim 1 wherein said floor and said rail are both rectangularly shaped, said floor has a floor total outer length dimension and a floor total outer width dimension, said rail has a rail total outer length dimension and a rail total outer width dimension, said rail length dimension is greater than said floor length dimension, and said rail width dimension is greater than said floor width dimension.

56. The low depth, nestable tray of claim 1 wherein said cylindrical surface extends the full height of said rail, from top to bottom thereof.

57. The low depth, nestable tray of claim 1 wherein said floor comprises an open lattice construction including strengthening ribs.

58. The low depth, nestable tray of claim 1 wherein said floor includes outer floor edges extending laterally out beyond bottom outer portions of said columns adjacent thereto.

59. The low depth, nestable tray of claim 1 wherein said floor is planar flat across and along said entire top surface.

* * * * *